United States Patent
Song et al.

(10) Patent No.: US 10,560,974 B2
(45) Date of Patent: Feb. 11, 2020

(54) METHOD AND APPARATUS FOR CONNECTING DEVICE BY USING BLUETOOTH TECHNOLOGY

(71) Applicant: LG ELECTRONICS INC., Seoul (KR)

(72) Inventors: Taeyoung Song, Seoul (KR); Jingu Choi, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/332,312

(22) PCT Filed: Sep. 11, 2017

(86) PCT No.: PCT/KR2017/009939
§ 371 (c)(1),
(2) Date: Mar. 11, 2019

(87) PCT Pub. No.: WO2018/048268
PCT Pub. Date: Mar. 15, 2018

(65) Prior Publication Data
US 2019/0215879 A1 Jul. 11, 2019

Related U.S. Application Data

(60) Provisional application No. 62/393,090, filed on Sep. 11, 2016, provisional application No. 62/393,660, filed on Sep. 13, 2016.

(51) Int. Cl.
*H04W 12/06* (2009.01)
*H04W 76/10* (2018.01)
(Continued)

(52) U.S. Cl.
CPC ............. *H04W 76/10* (2018.02); *G10L 15/22* (2013.01); *G10L 15/30* (2013.01); *H04W 4/06* (2013.01);
(Continued)

(58) Field of Classification Search
CPC ........... H04W 4/00; H04W 4/06; H04W 4/20; H04W 4/80; H04W 12/06; H04W 12/08;
(Continued)

(56) References Cited

U.S. PATENT DOCUMENTS

2002/0091527 A1* 7/2002 Shiau ...................... G10L 15/30
704/270.1
2010/0217837 A1* 8/2010 Ansari ..................... H04L 63/02
709/218
(Continued)

FOREIGN PATENT DOCUMENTS

EP      1 104 155 A2    5/2001
KR      10-0879996 B1   1/2009
(Continued)

*Primary Examiner* — Thanh C Le
(74) *Attorney, Agent, or Firm* — Birch, Stewart, Kolasch & Birch, LLP

(57) ABSTRACT

Disclosed are a method and an apparatus for selecting and connecting a gateway by a user device by using Bluetooth low energy technology, and a voice recognition system including a first device, a first gateway, and a voice recognition server. The first device broadcasts a voice signal to a neighboring gateway, the voice signal is forwarded to the voice recognition server by neighboring gateways, and the voice recognition server transmits a connection request message to an optimal gateway by processing the voice signal. After authentication of the voice recognition server is performed, the optimal gateway receiving the connection request message and a user device are connected to each other.

14 Claims, 29 Drawing Sheets

(51) Int. Cl.
  *G10L 15/22* (2006.01)
  *H04W 4/20* (2018.01)
  *G10L 15/30* (2013.01)
  *H04W 4/80* (2018.01)
  *H04W 4/06* (2009.01)
  *H04W 88/16* (2009.01)

(52) U.S. Cl.
  CPC ............... *H04W 4/20* (2013.01); *H04W 4/80* (2018.02); *H04W 12/06* (2013.01); *H04W 88/16* (2013.01)

(58) Field of Classification Search
  CPC ...... H04W 76/10; H04W 88/16; G10L 15/22; G10L 15/30
  See application file for complete search history.

(56) References Cited

U.S. PATENT DOCUMENTS

| | | | |
|---|---|---|---|
| 2015/0071437 A1* | 3/2015 | Chastain | H04W 12/06 380/249 |
| 2016/0156682 A1* | 6/2016 | Jeon | H04W 4/023 709/204 |
| 2016/0165387 A1 | 6/2016 | Nhu | |

FOREIGN PATENT DOCUMENTS

| | | |
|---|---|---|
| KR | 10-2015-0053276 A | 5/2015 |
| KR | 10-2016-0086179 A | 7/2016 |

\* cited by examiner

[FIG. 1]
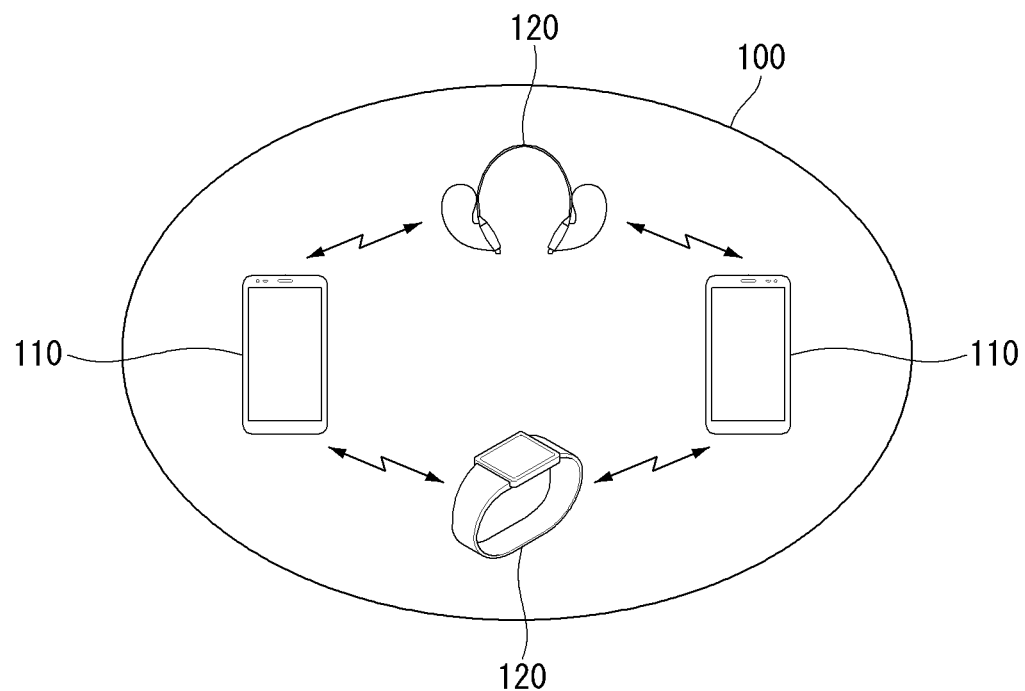

[FIG. 2]
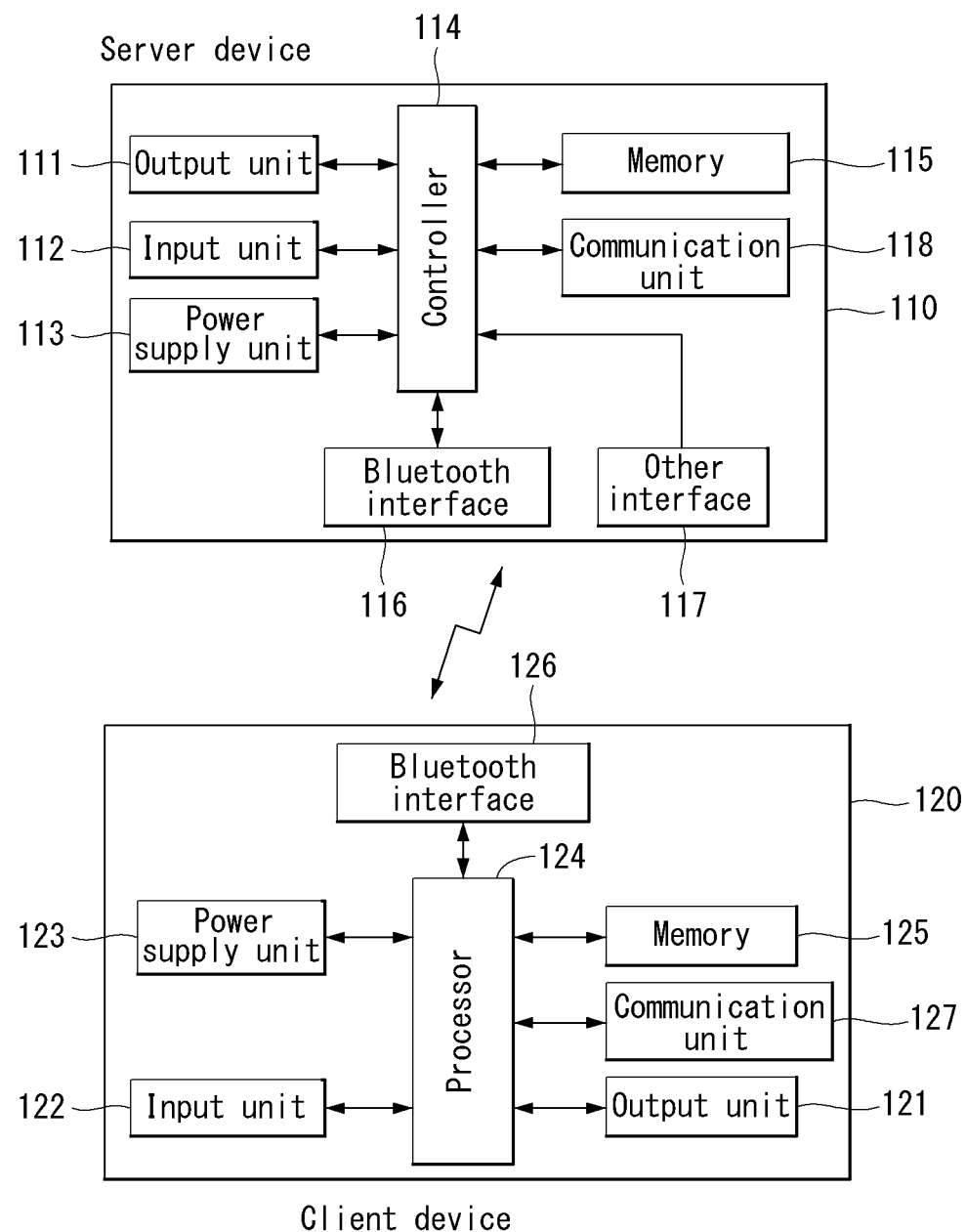

[FIG. 3]
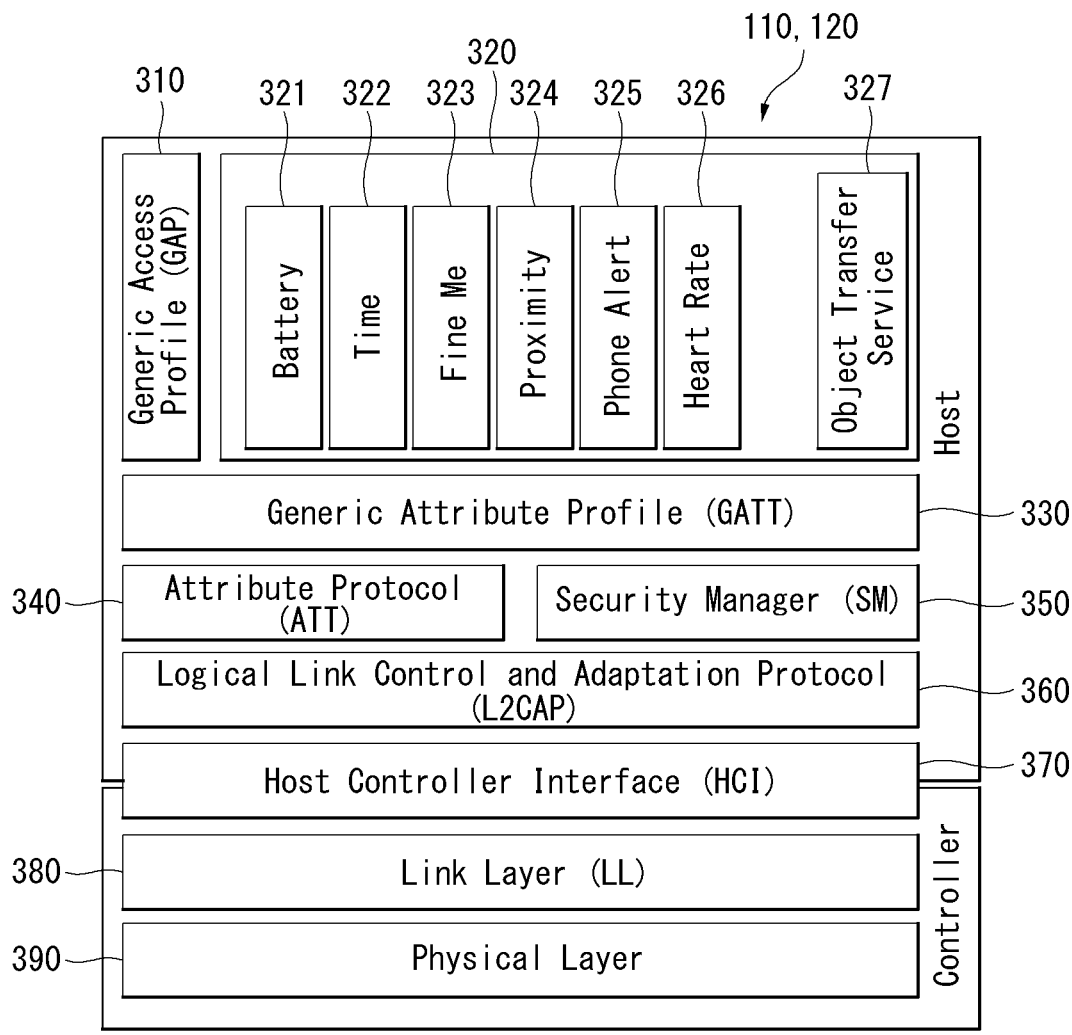

[FIG. 4]
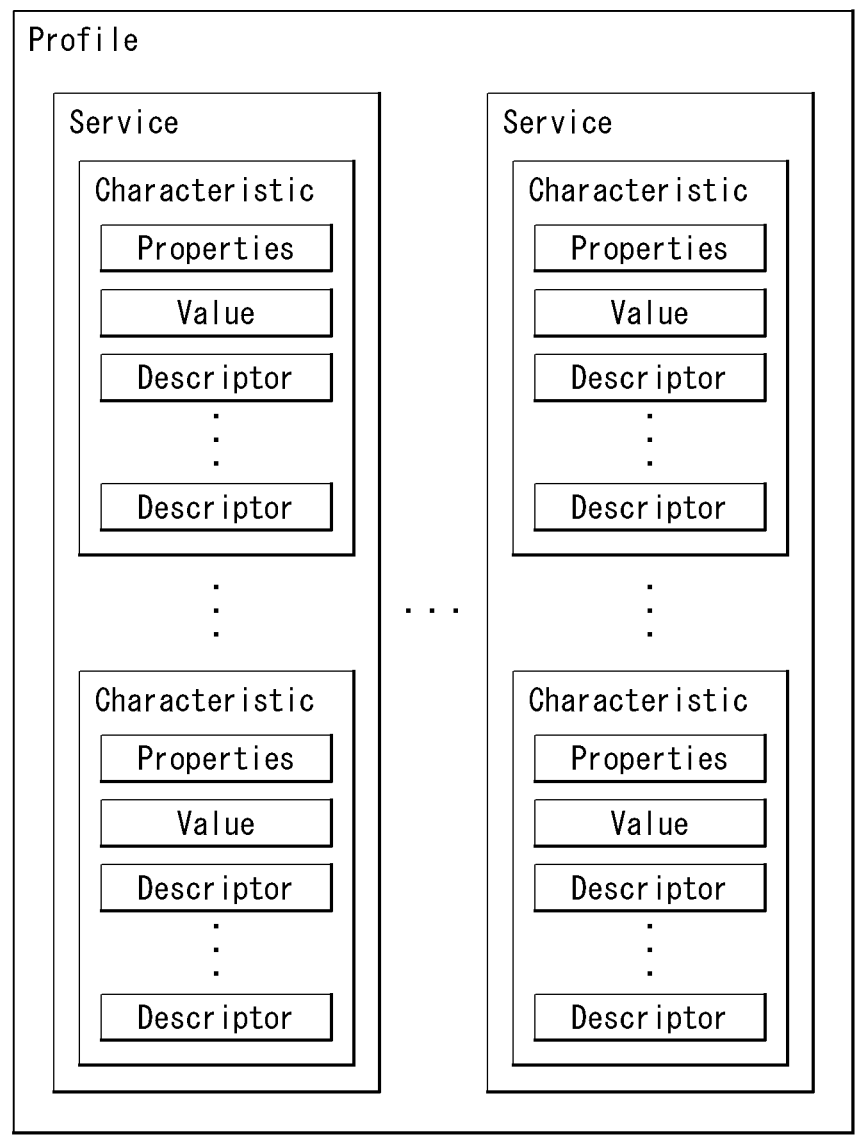

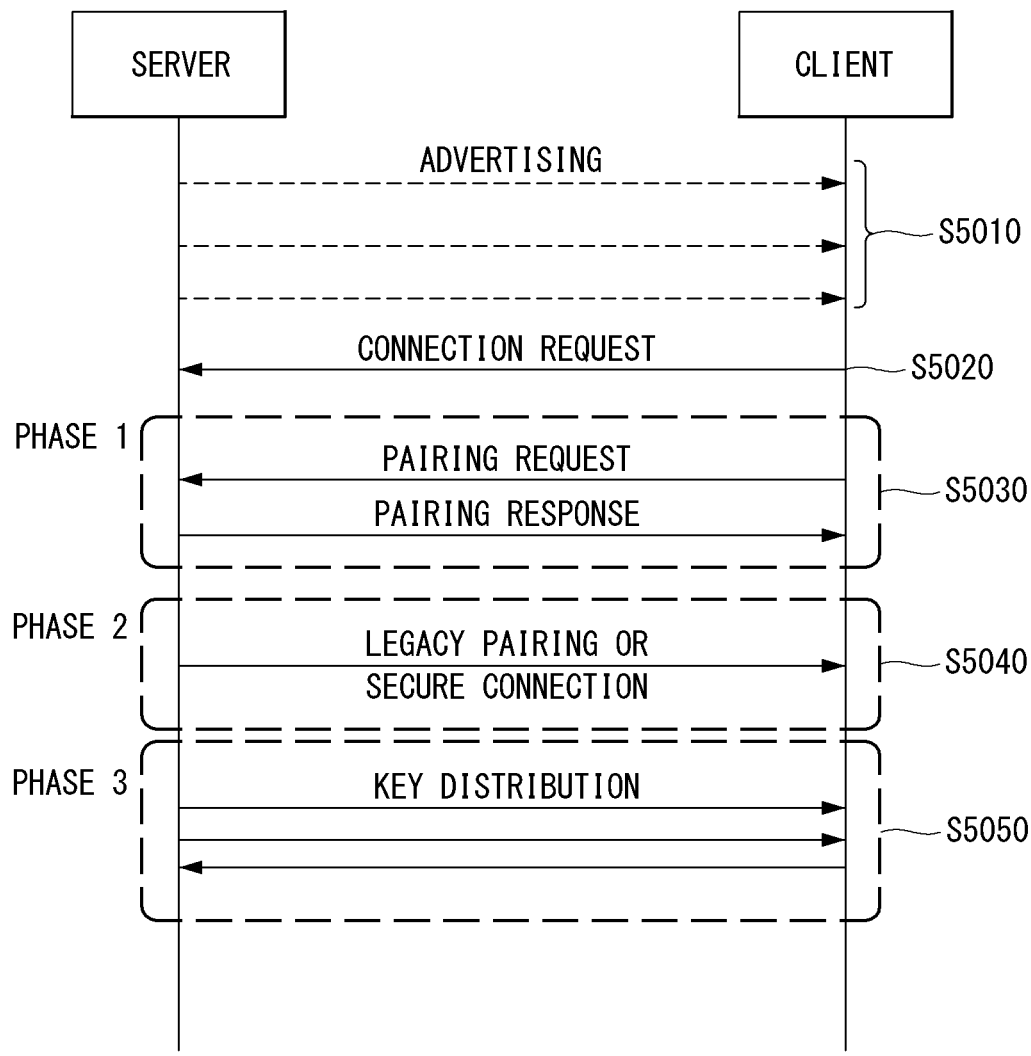
[FIG. 5]

[FIG. 6]
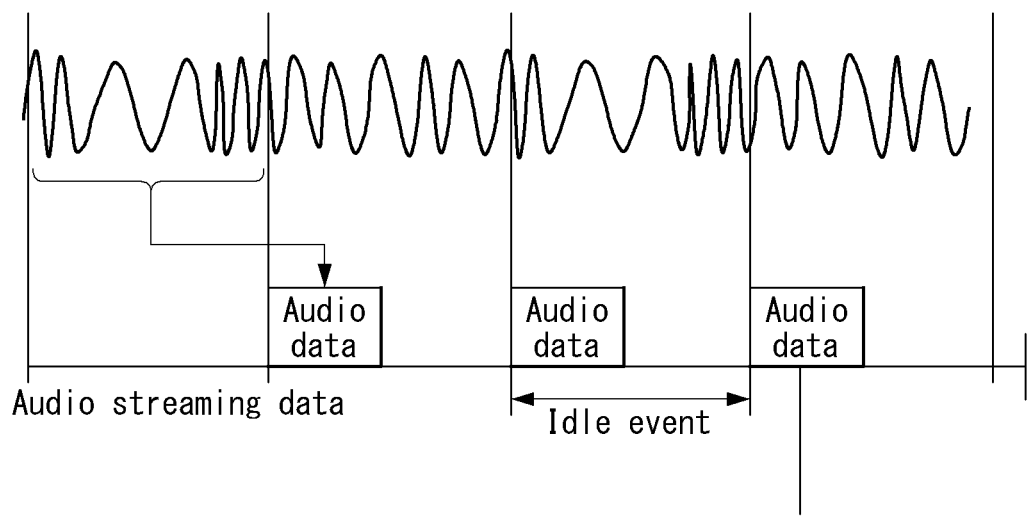

[FIG. 7]
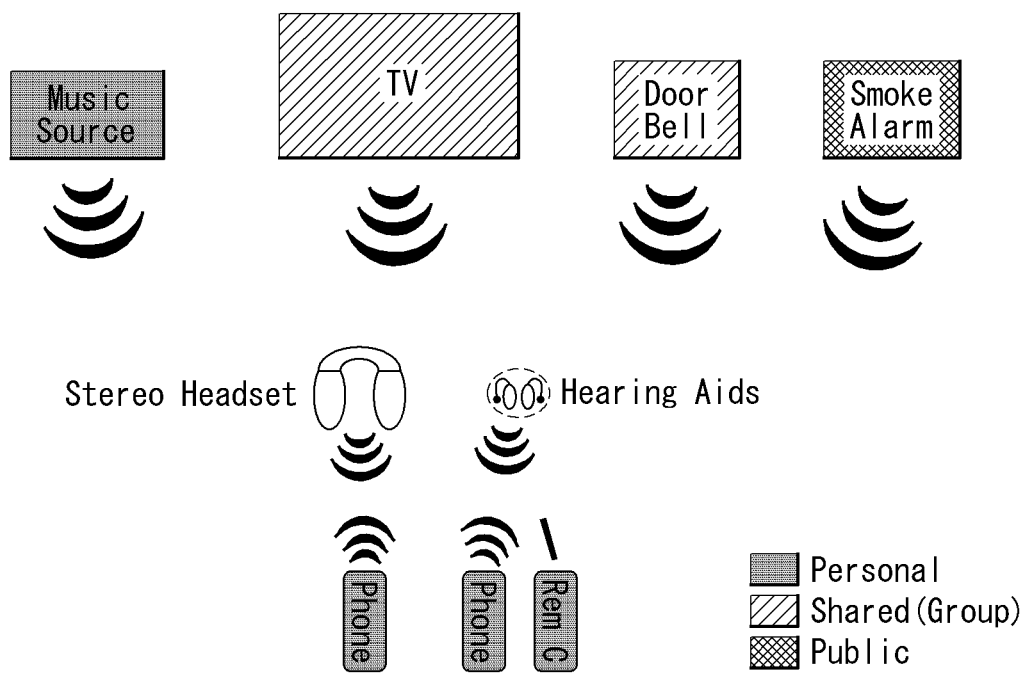

[FIG. 8]
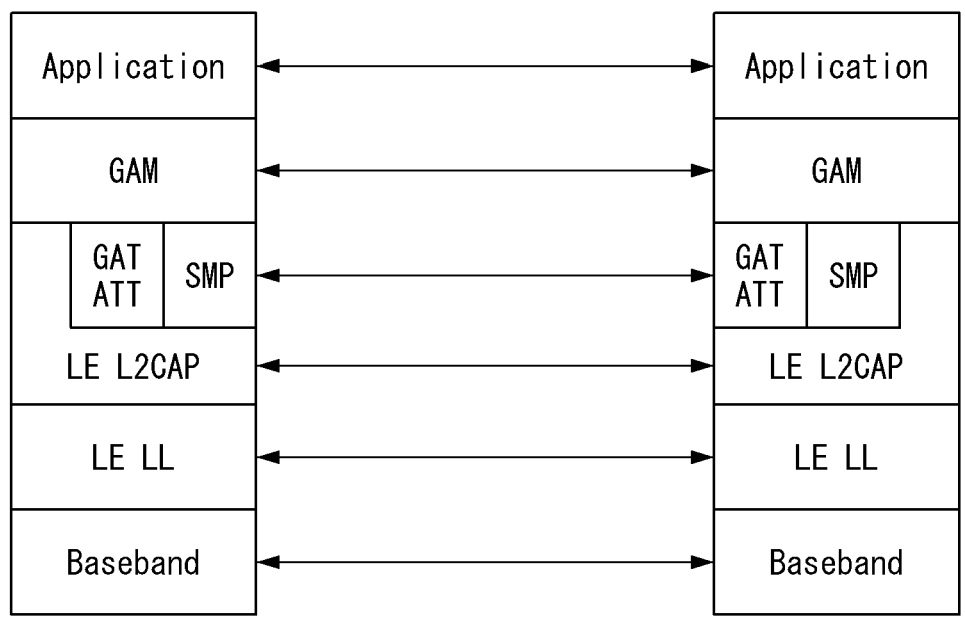

[FIG. 9]
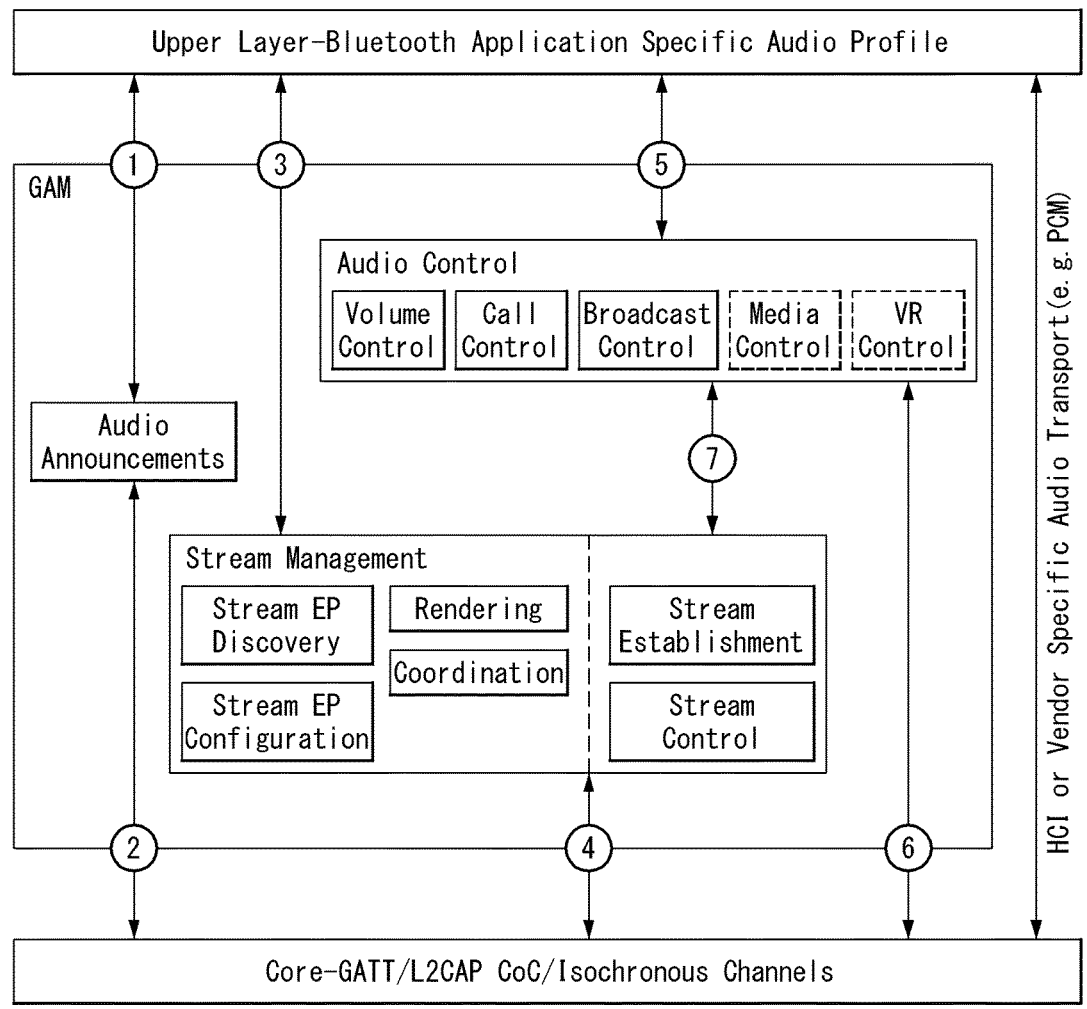

[FIG. 10]
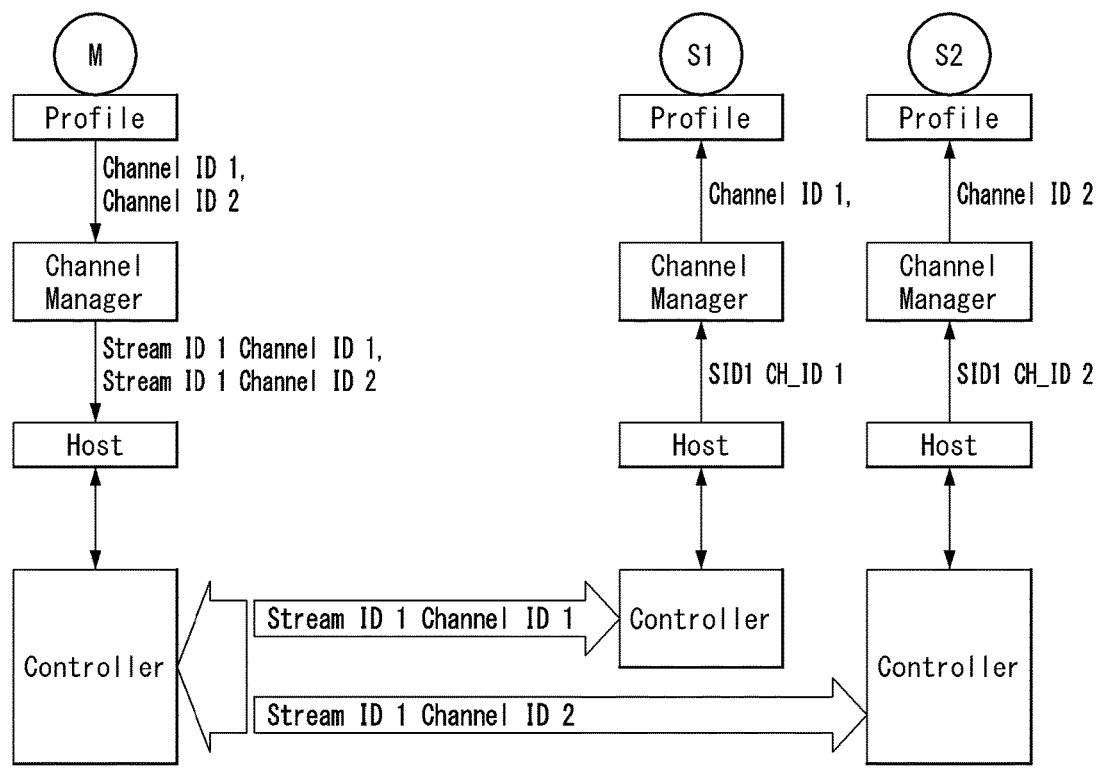

[FIG. 11]
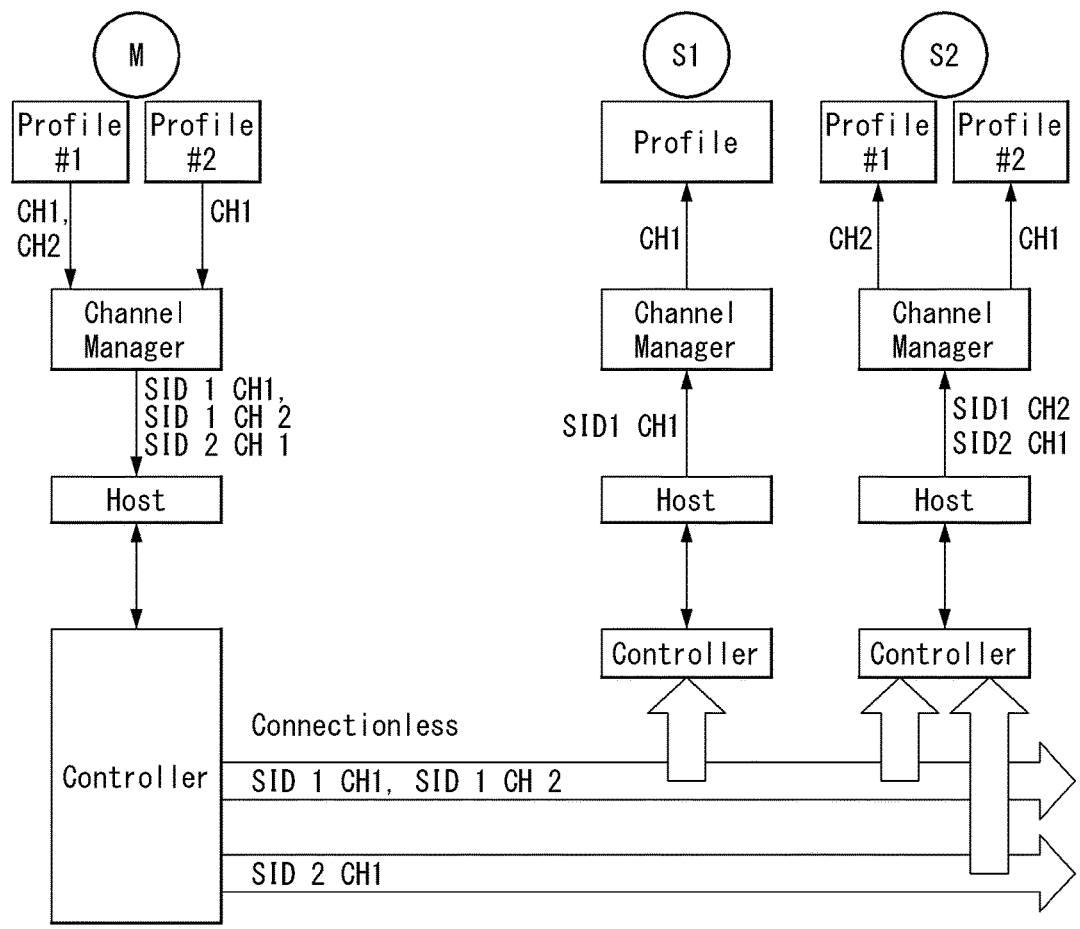

[FIG. 12]
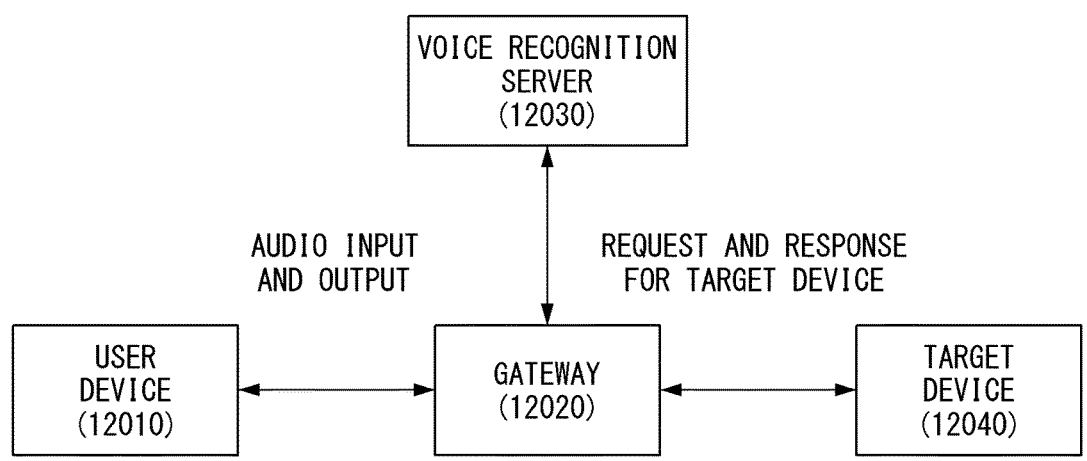

[FIG. 13]
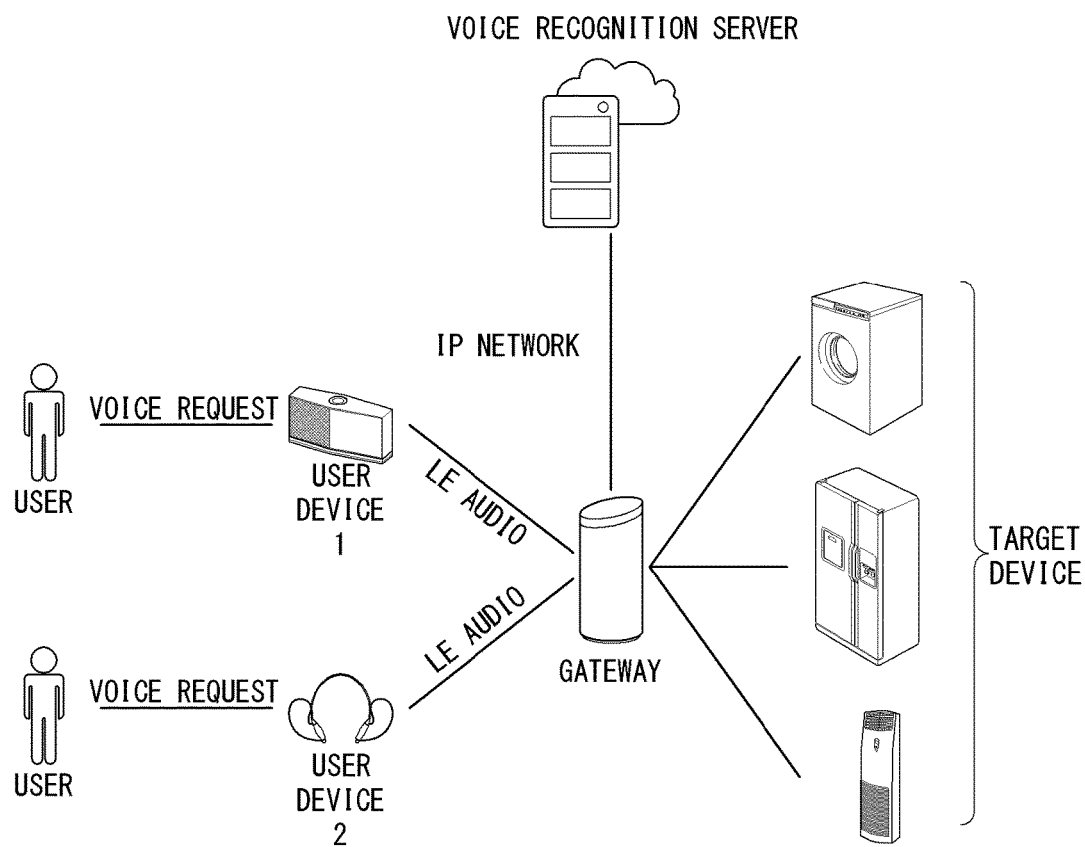

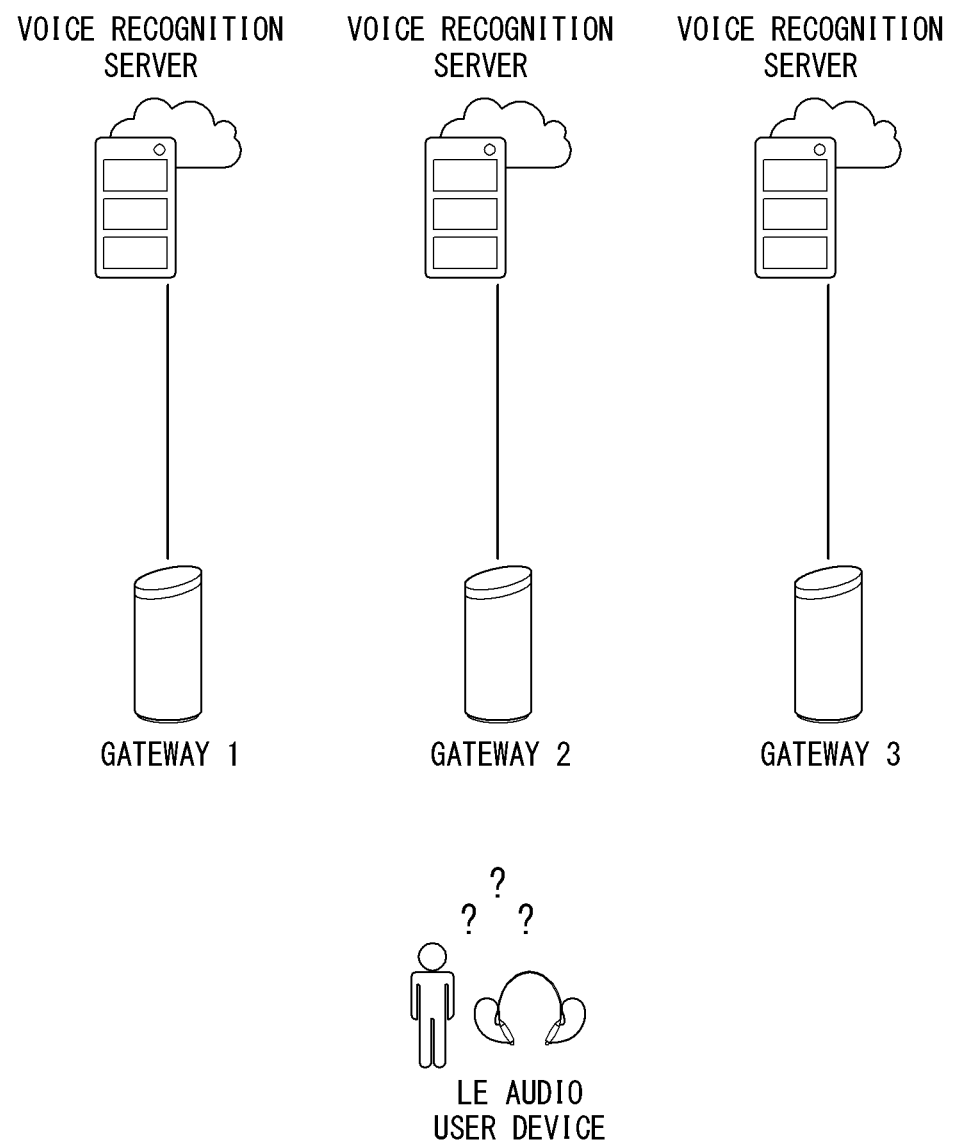

[FIG. 15]
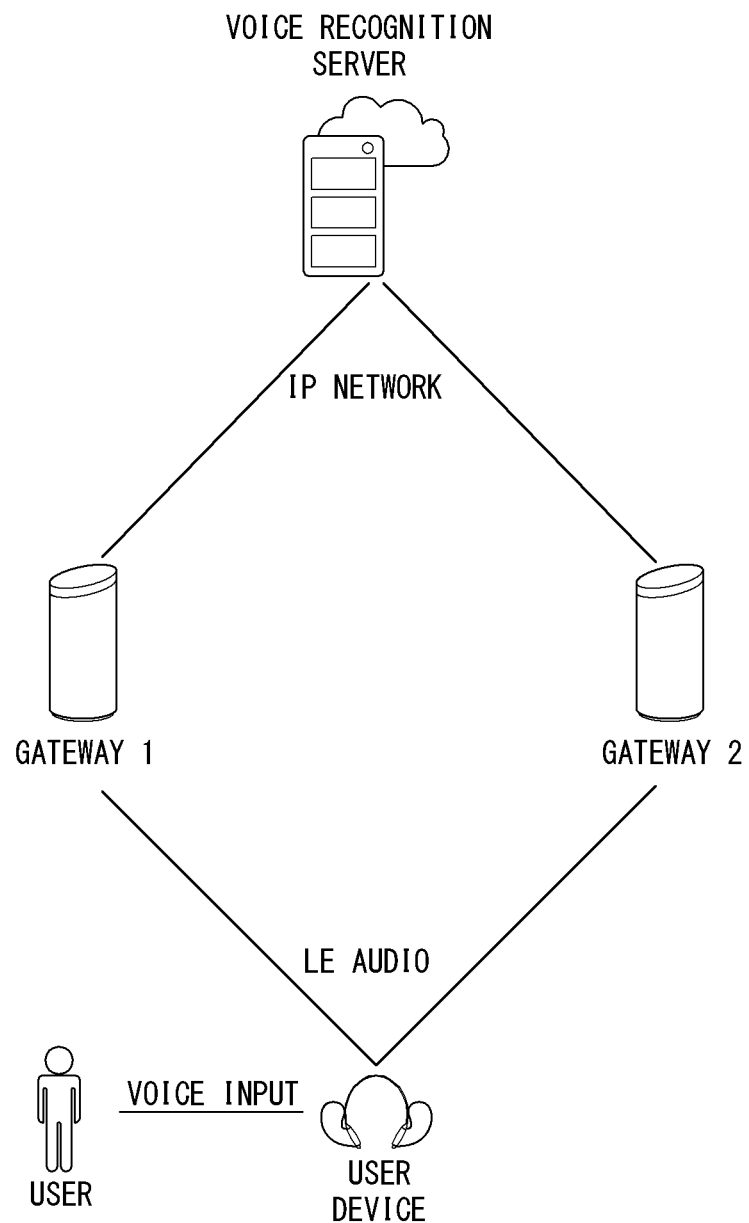

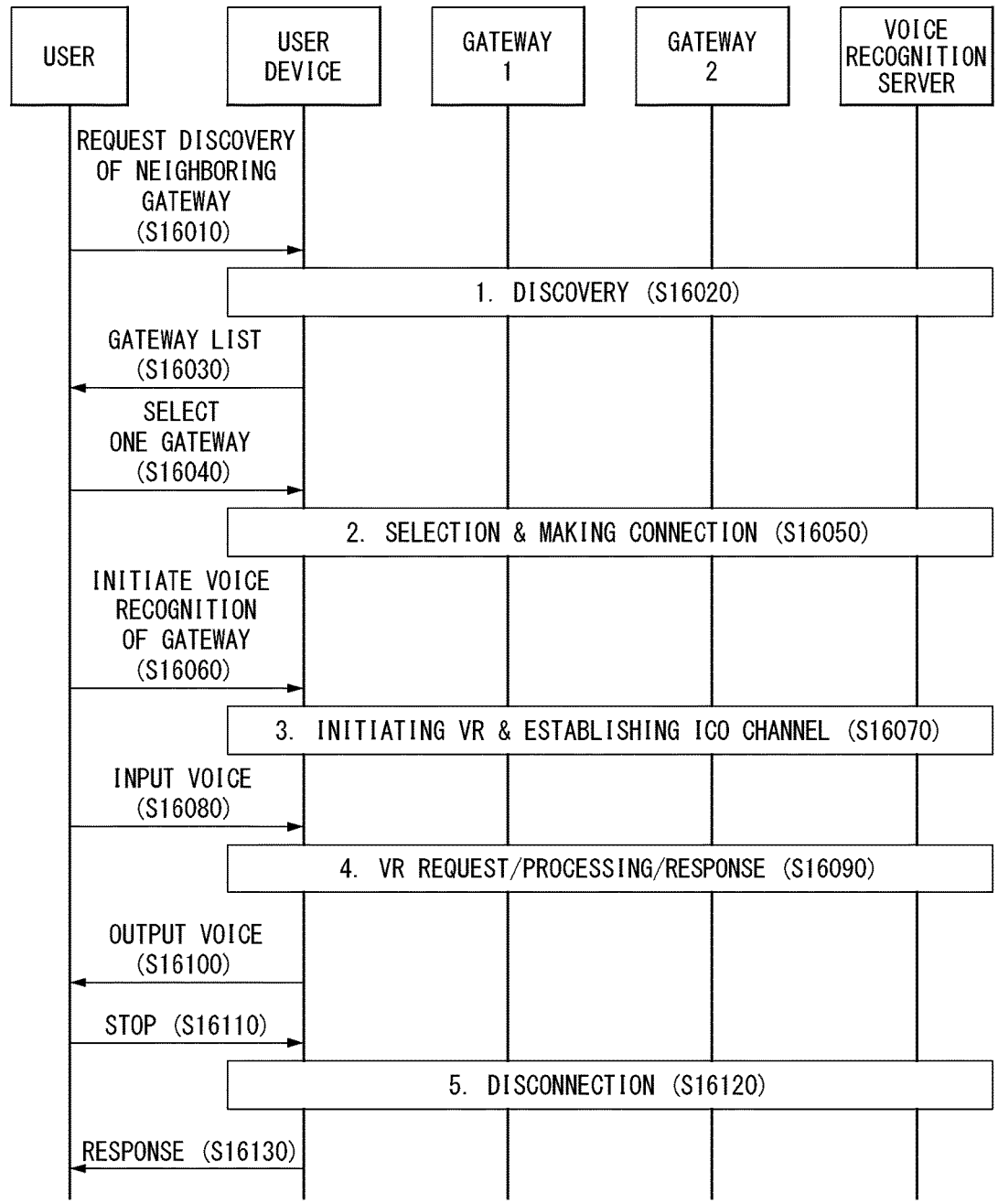
[FIG. 16]

[FIG. 17]
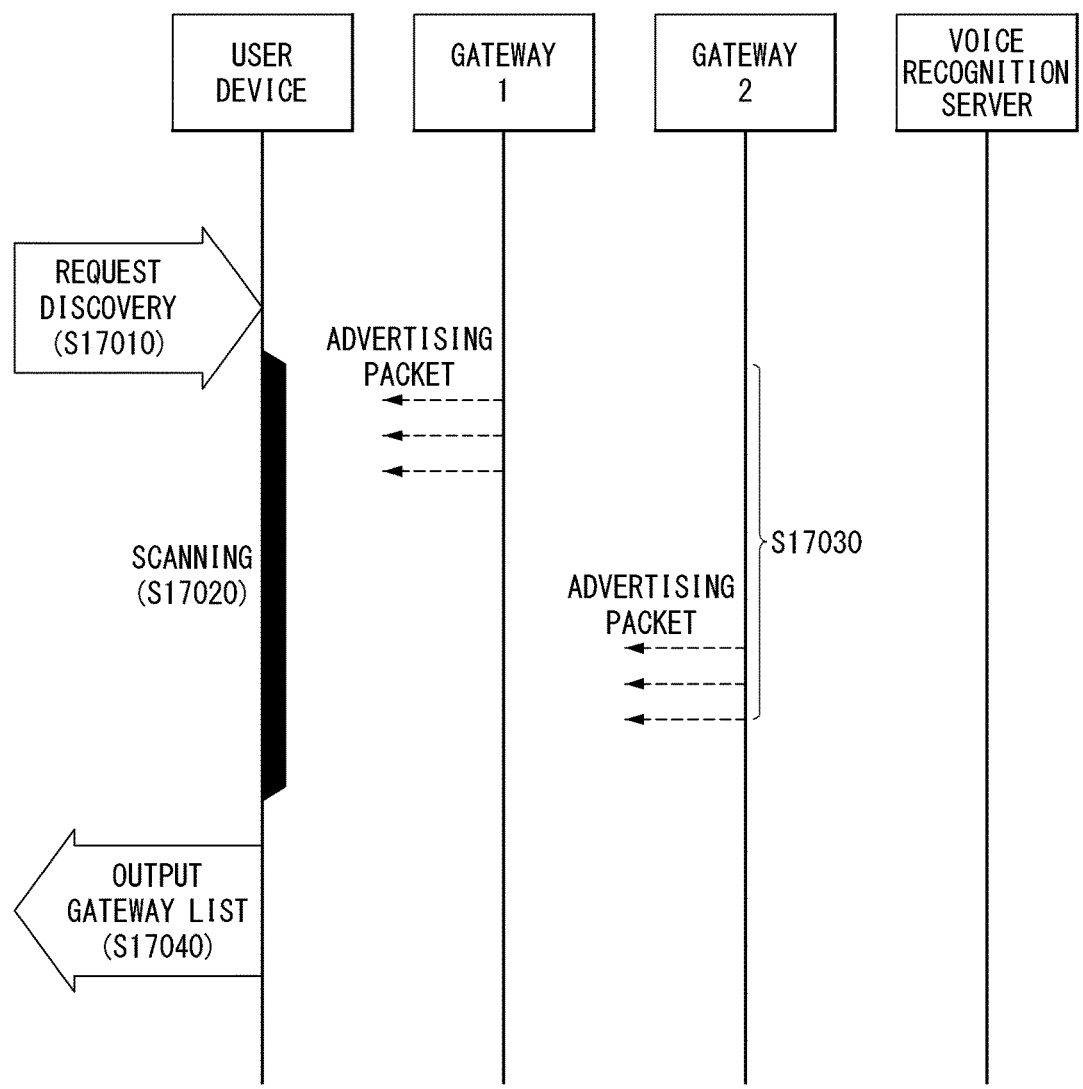

[FIG. 18]
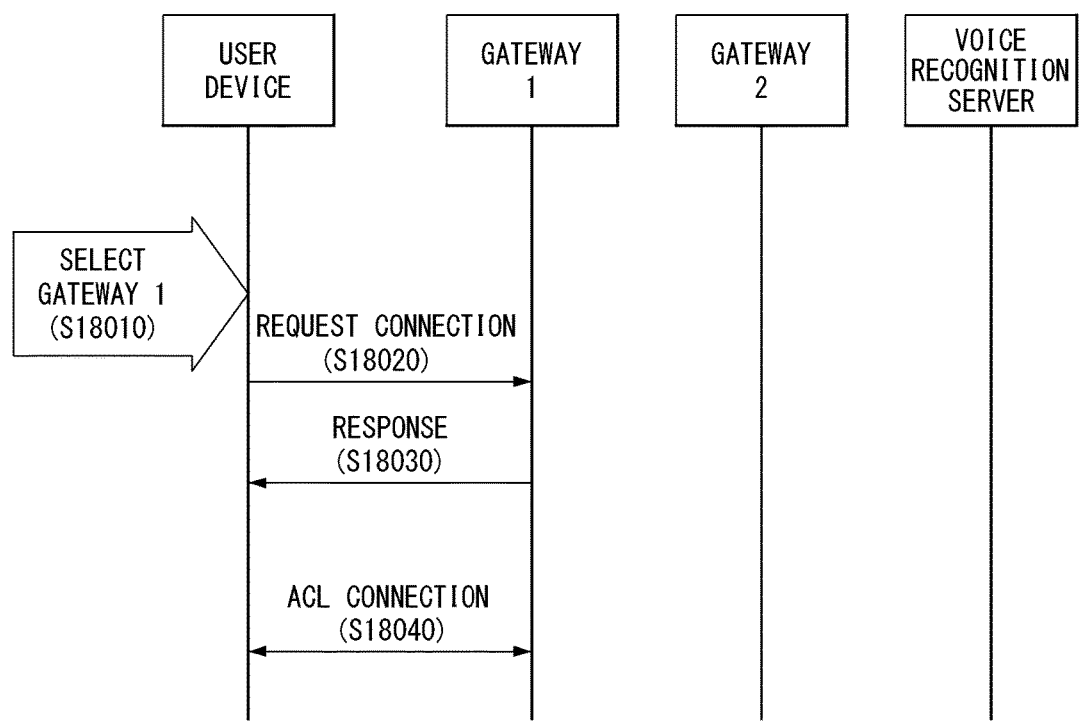

[FIG. 19]
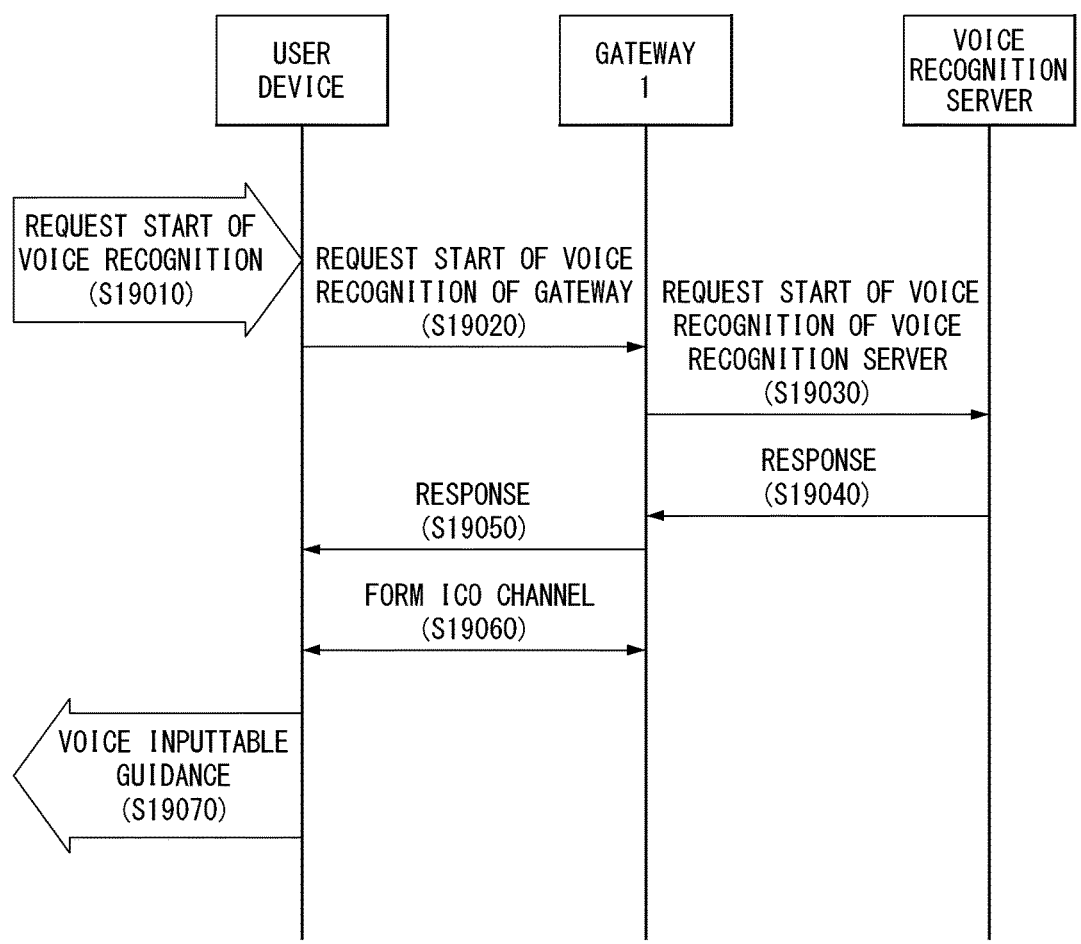

[FIG. 20]
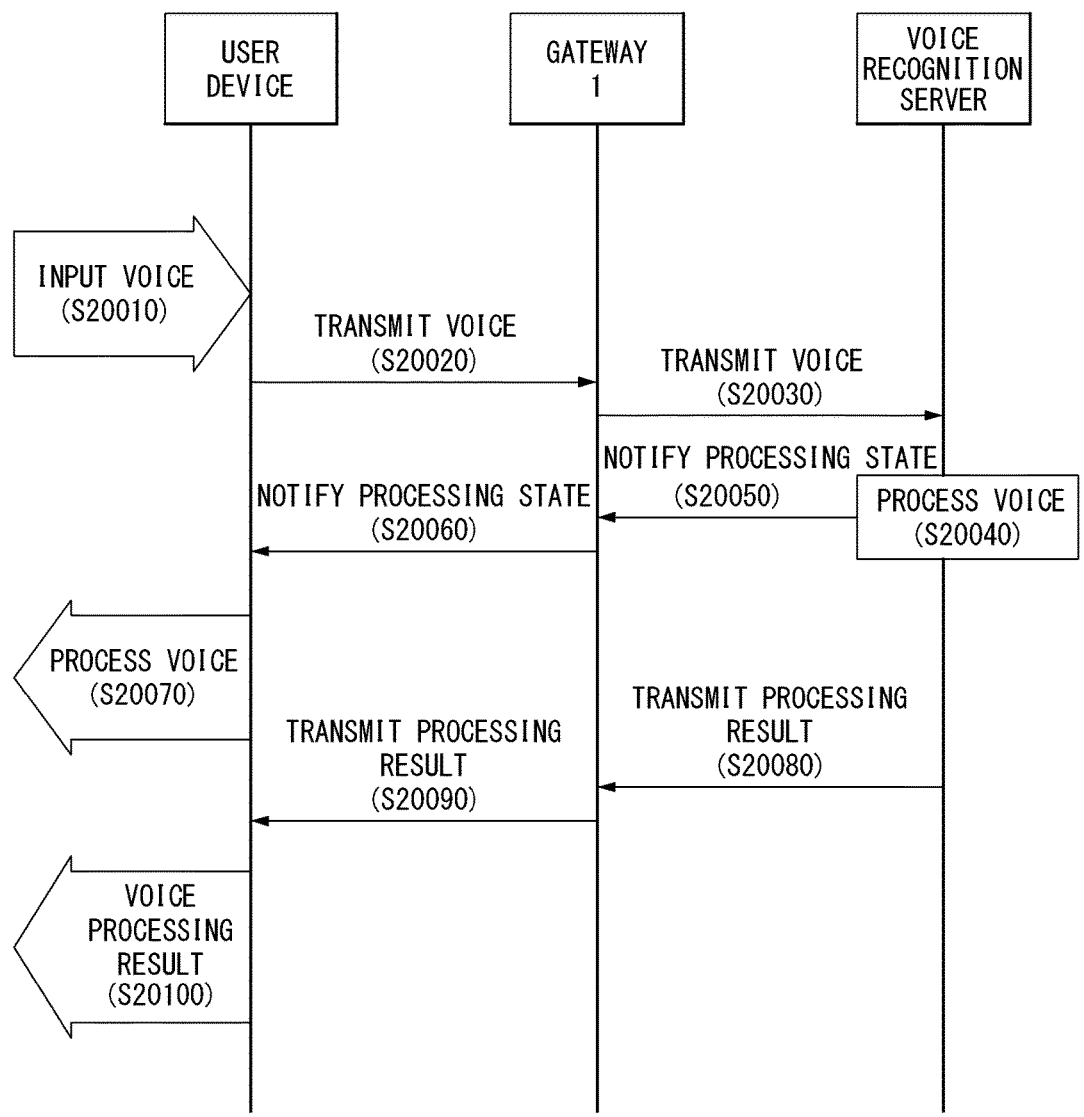

[FIG. 21]
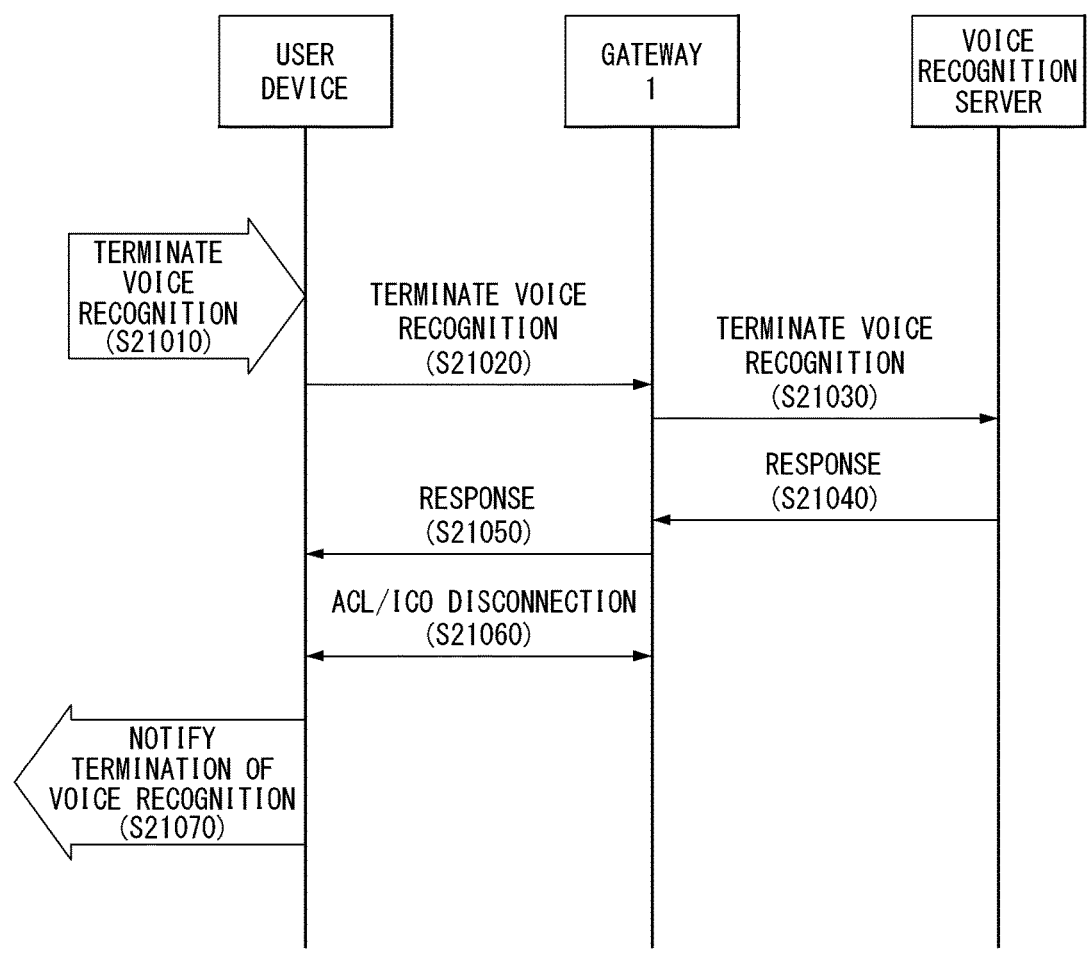

[FIG. 22]
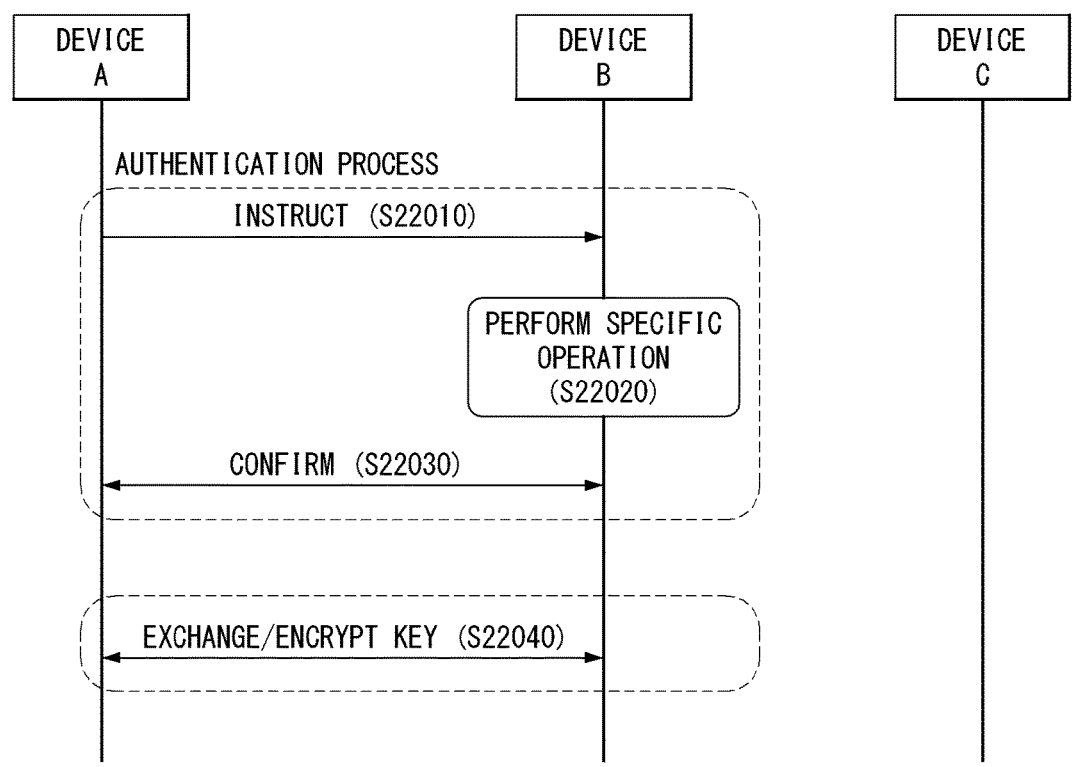

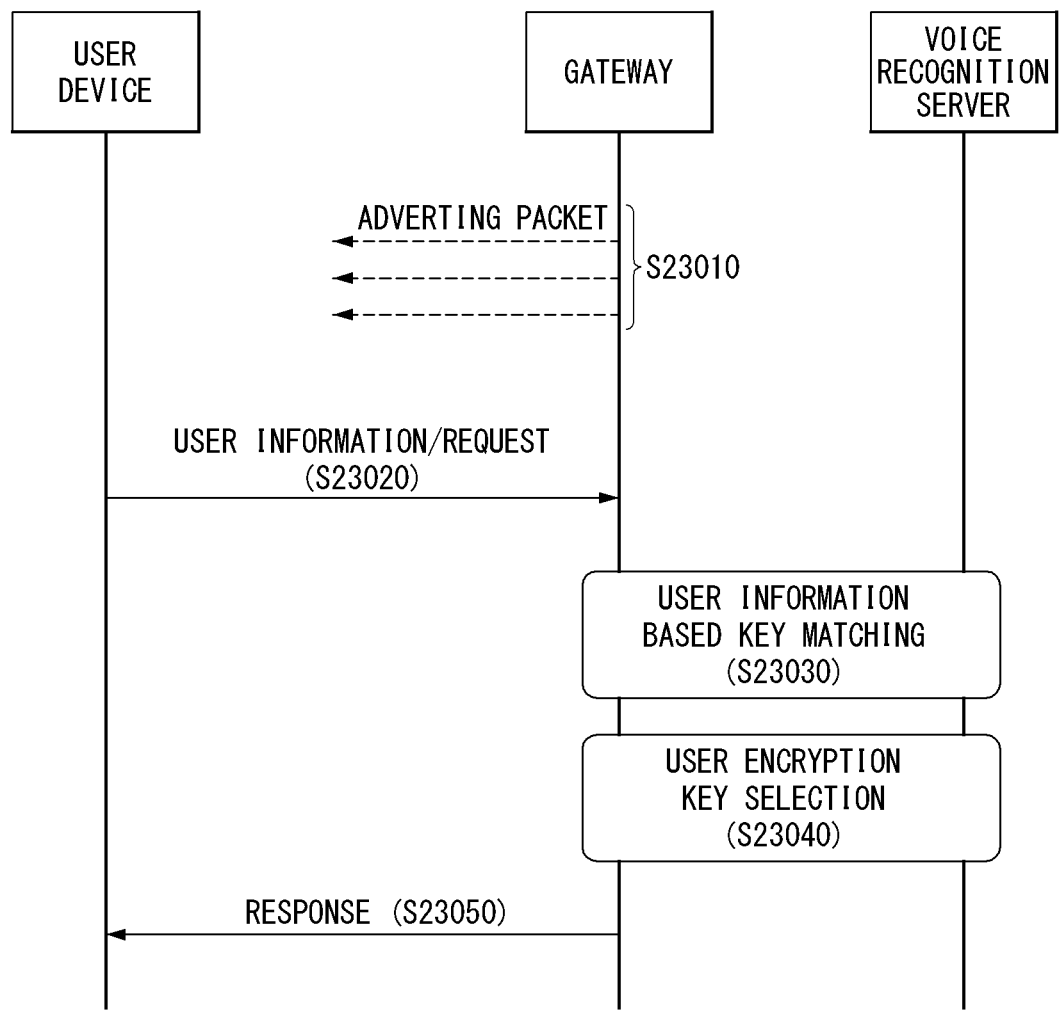
[FIG. 23]

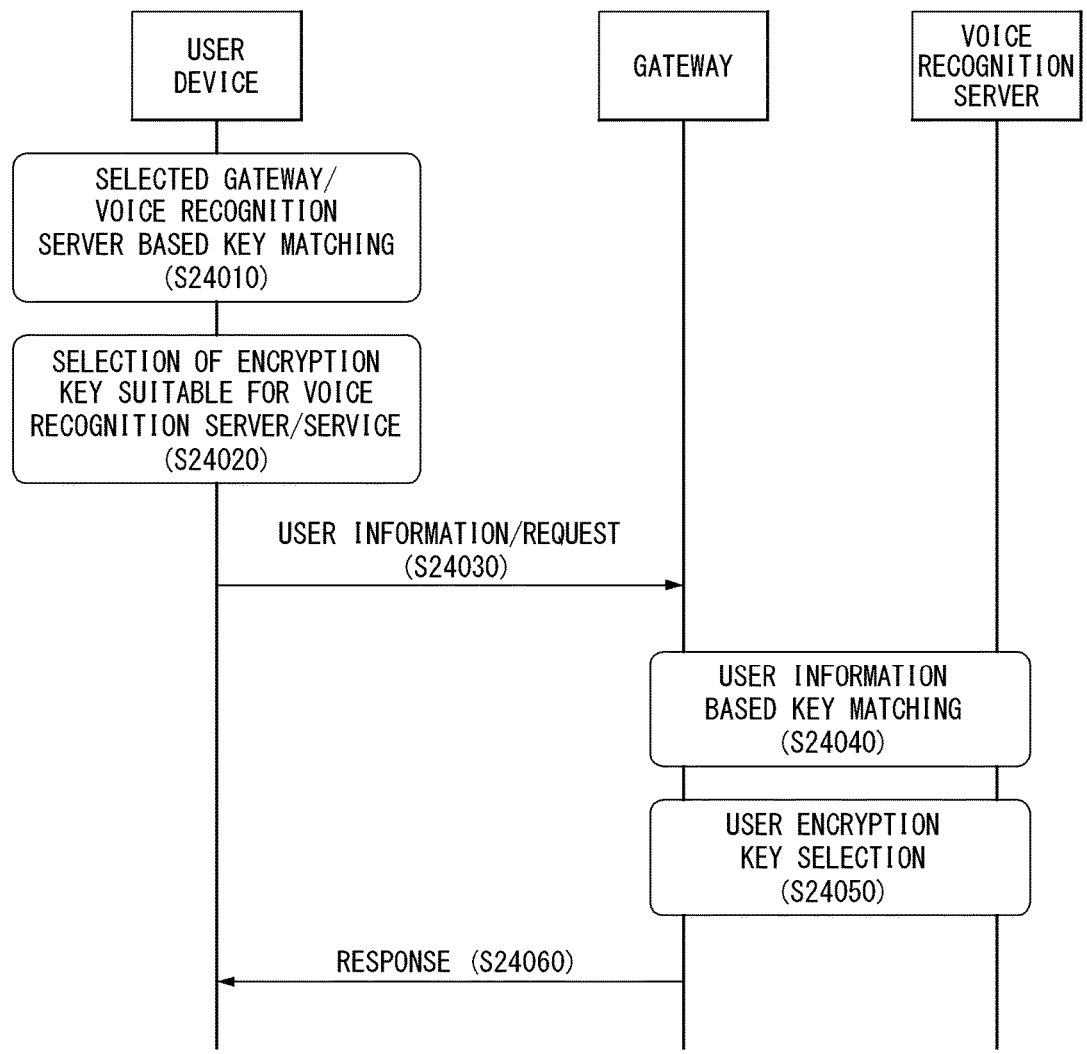

[FIG. 25]
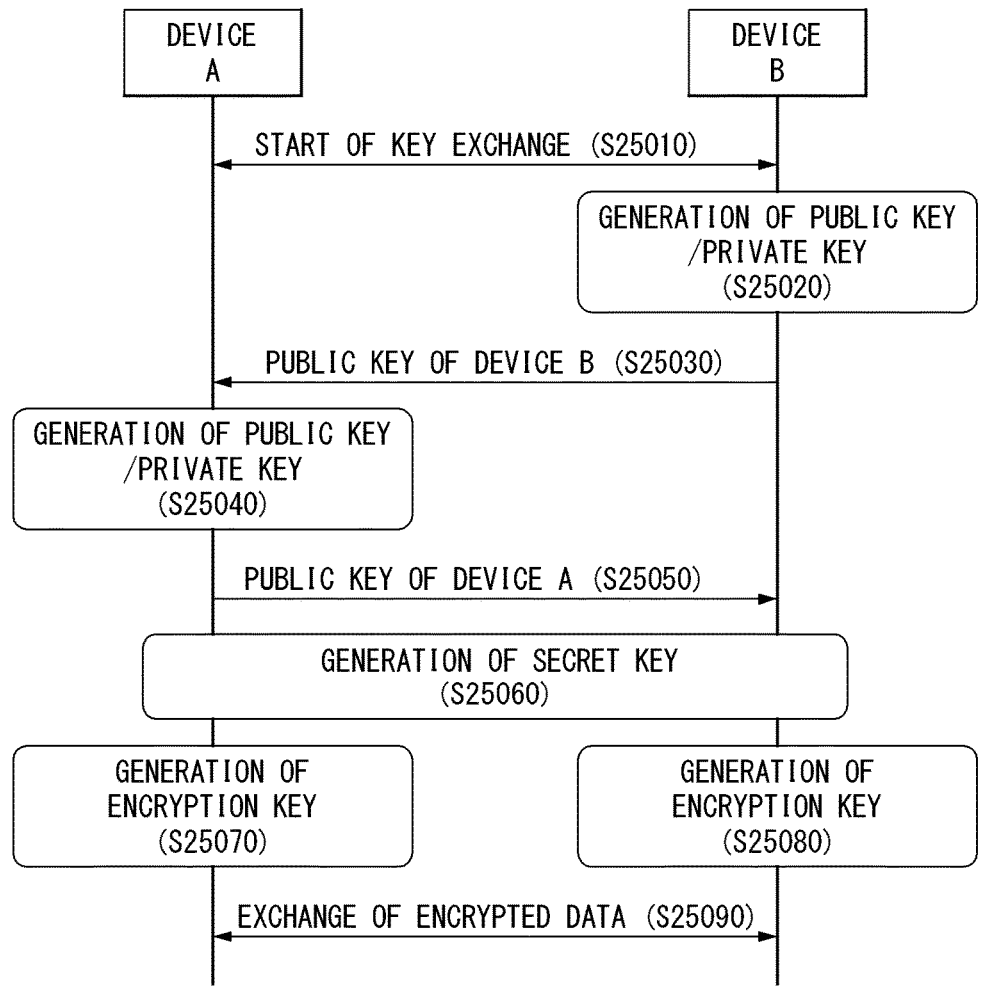
(a) KEY EXCHANGE PROCESS
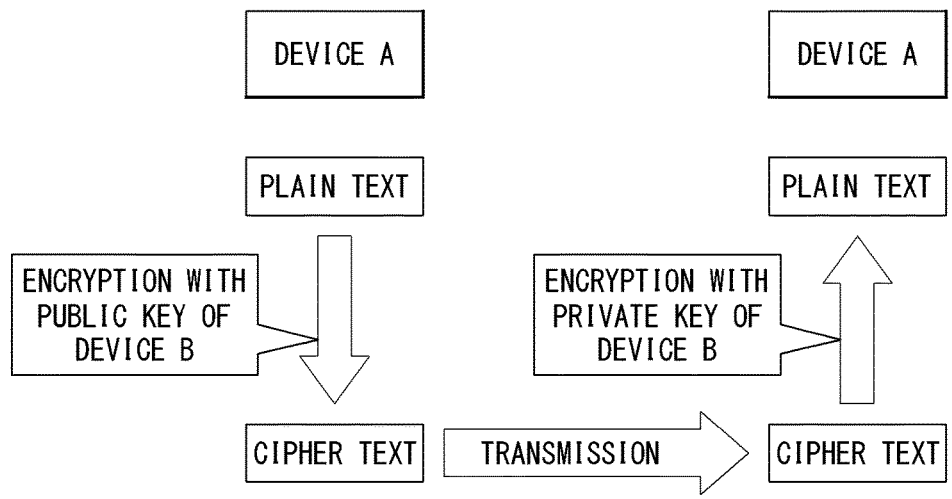
(b) CIPHER TEXT GENERATION AND INTERPRETATION PROCESS

[FIG. 26]
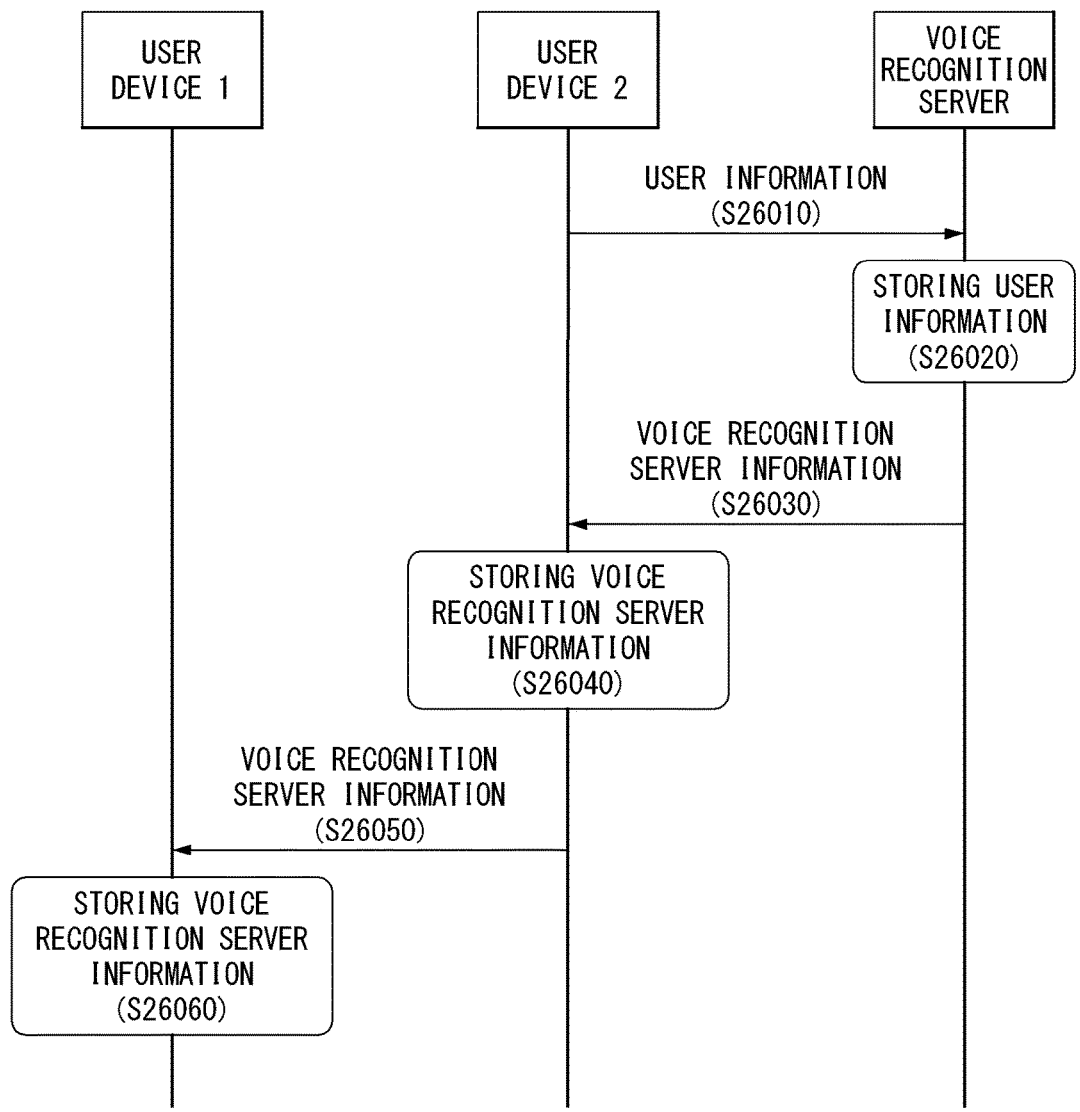

[FIG. 27]
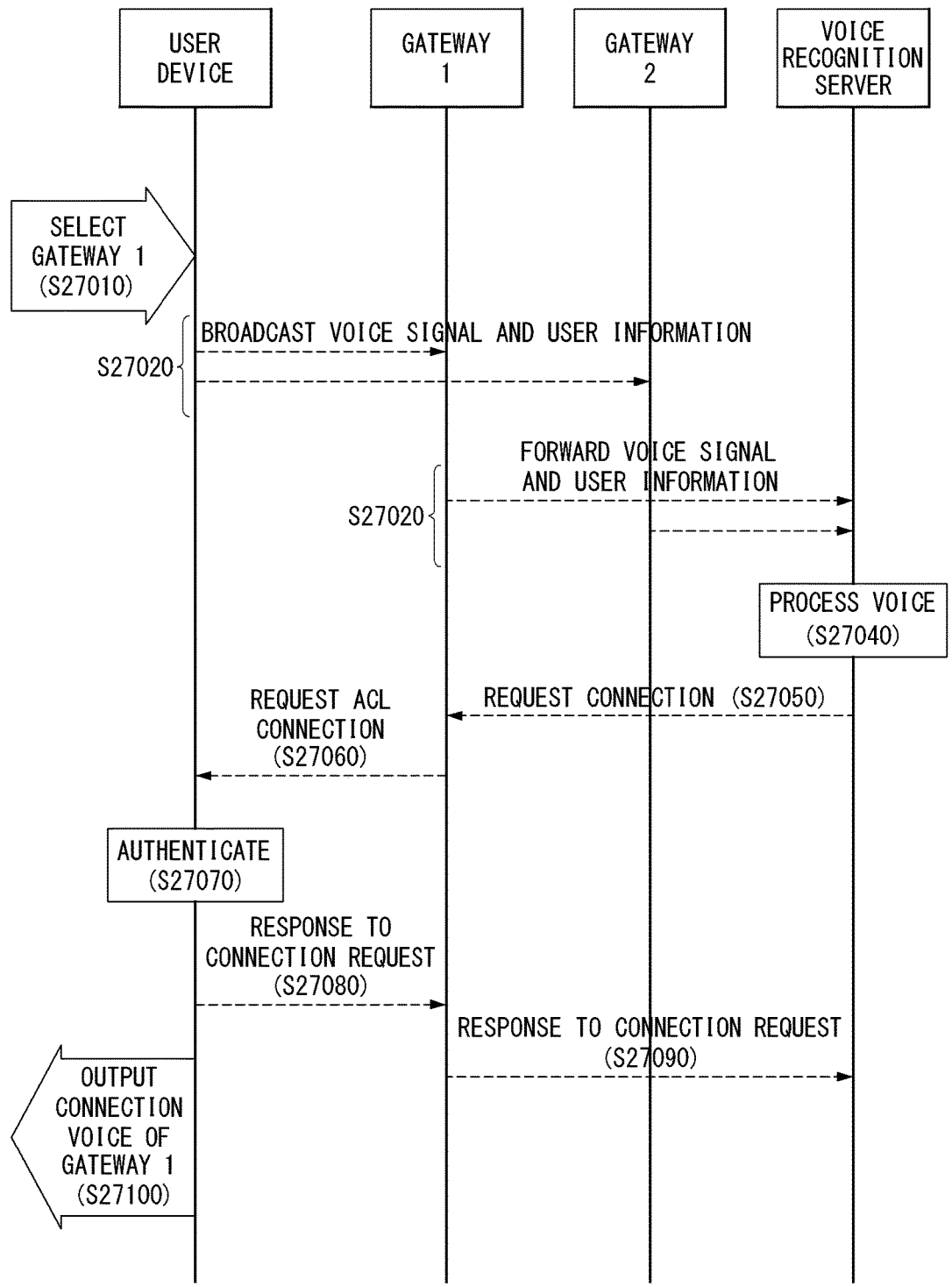

[FIG. 28]
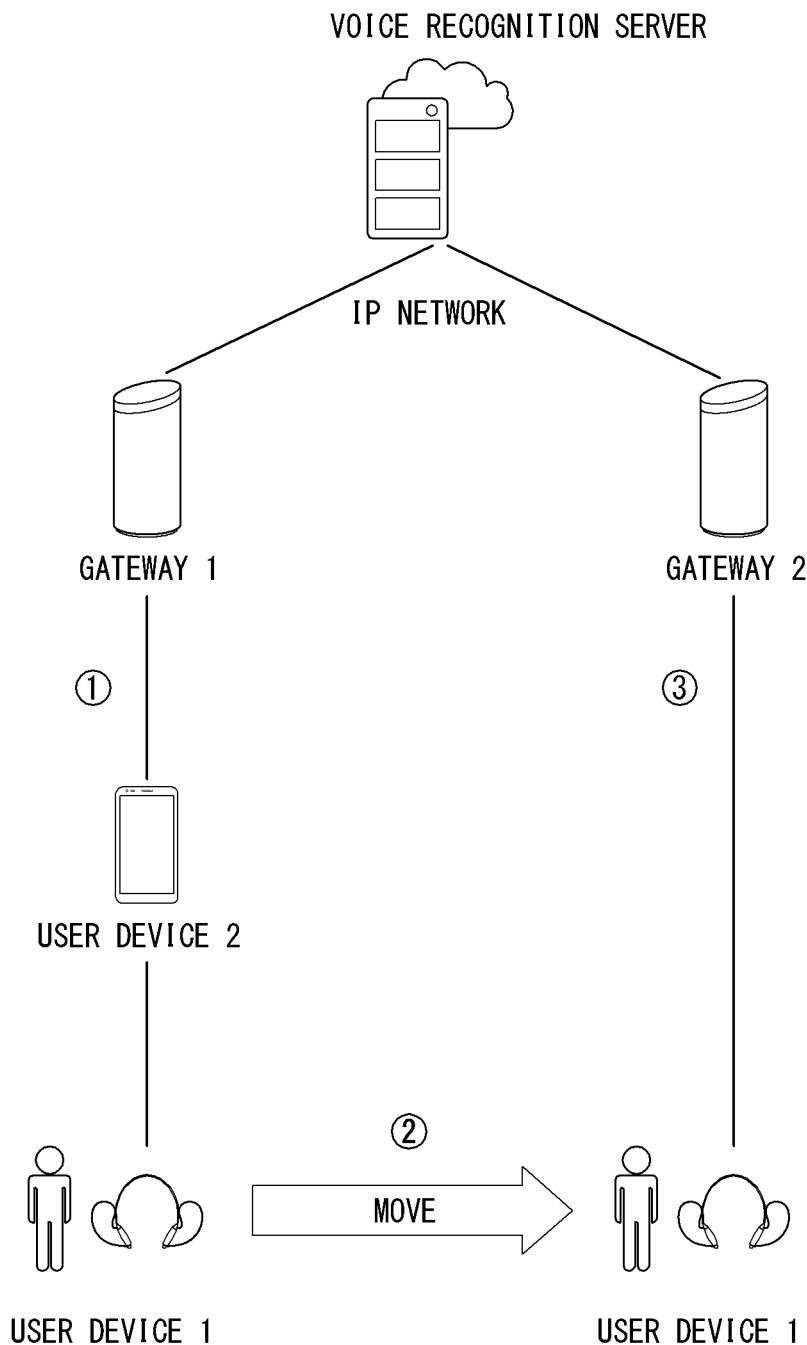

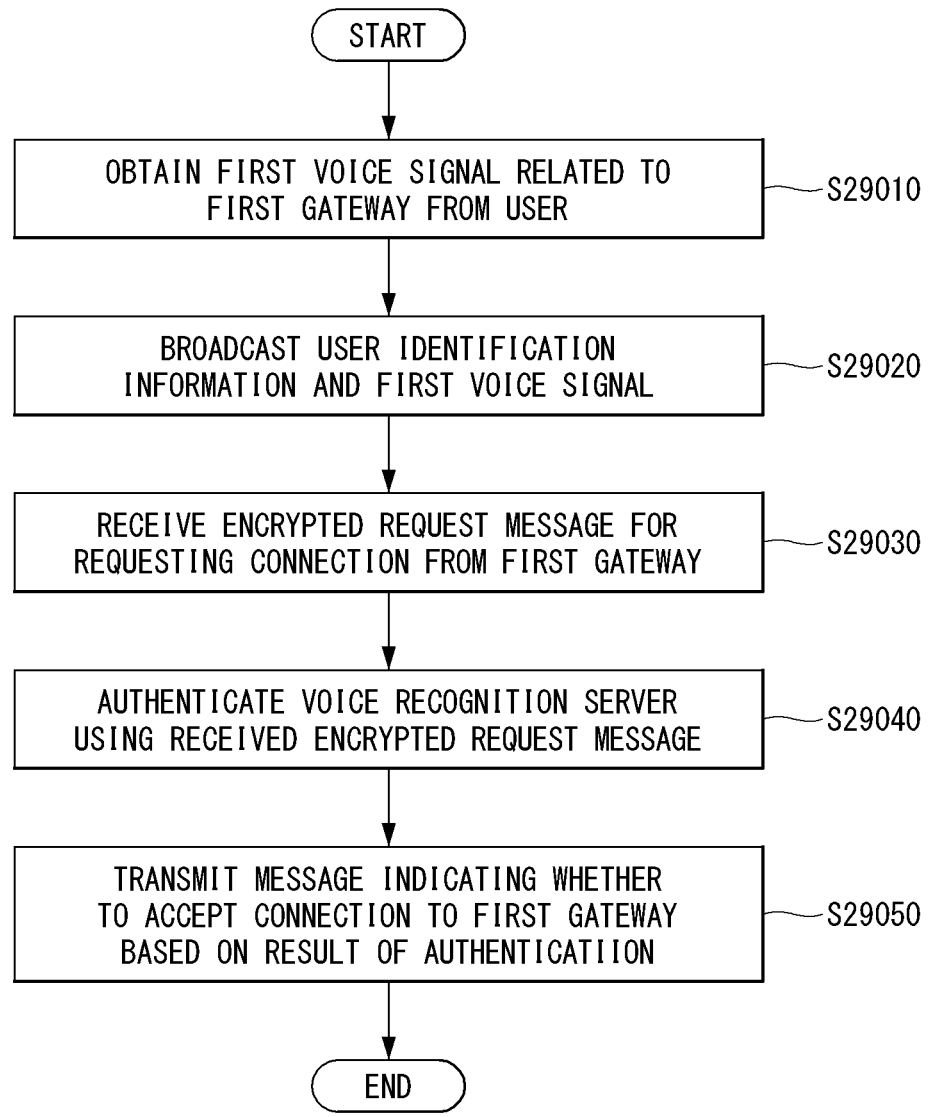
[FIG. 29]

METHOD AND APPARATUS FOR CONNECTING DEVICE BY USING BLUETOOTH TECHNOLOGY

CROSS REFERENCE TO RELATED APPLICATIONS

This application is the National Phase of PCT International Application No. PCT/KR2017/009939, filed on Sep. 11, 2017, which claims priority under 35 U.S.C. 119(e) to U.S. Provisional Application No. 62/393,090, filed on Sep. 11, 2016 and U.S. Provisional Application No. 62/393,660, filed on Sep. 13, 2016, all of which are hereby expressly incorporated by reference into the present application.

TECHNICAL FIELD

The present invention relates to a method and an apparatus for controlling a device using Bluetooth as short-range technology in a wireless communication system, and more particularly, to a method and an apparatus for selecting a gateway by using a voice signal and connecting with the selected gateway by using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The present invention provides a method and an apparatus for transmitting audio data and voice data using Bluetooth technology.

Furthermore, the present invention provides a method and an apparatus for selecting a specific gateway using a voice signal.

Furthermore, the present invention provides a method and an apparatus for forming a connection with the gateway selected based on the voice signal.

Furthermore, the present invention provides a method and an apparatus for using a specific voice recognition service through the gateway selected based on the voice signal or transferring a voice command to a target device.

Furthermore, the present invention provides a method and an apparatus for performing a preliminary procedure of storing information of a voice recognition server in a user device in advance for a safe connection with the gateway.

The technical objects of the present invention are not limited to the aforementioned technical objects, and other technical objects, which are not mentioned above, will be apparently appreciated by a person having ordinary skill in the art from the following description.

Technical Solution

In order to solve the technical problem, a method for forming, by a first device, a connection with a first gateway by using Bluetooth low energy technology according to an embodiment of the present invention includes: obtaining from a user a first voice signal associated with the first gateway; broadcasting first user information for identifying the user and the first voice signal; receiving an encrypted request message for requesting the connection from the first gateway; authenticating a voice recognition server which is a server capable of processing a voice signal using the encrypted request message; and transmitting a message indicating whether to accept the connection to the first gateway based on a result of the authentication, in which the first user information is transmitted through a data channel for transmitting and receiving data and the first voice signal is transmitted through an isochronous channel for transmitting and receiving an audio signal.

Furthermore, in the connection forming method according to the embodiment of the present invention, the encrypted request message is generated by the voice recognition server based on the first voice signal.

Furthermore, the connection forming method according to the embodiment of the present invention further includes performing a preliminary procedure for registering the voice recognition server in the first device, in which the first device stores server information including a first public key of the voice recognition server through the preliminary procedure.

Furthermore, in the connection forming method according to the embodiment of the present invention, the performing of the preliminary procedure further includes receiving, from a second device, a message including the server information stored in the second device, and storing the server information.

Further, in the connection forming method according to the embodiment of the present invention, the authenticating of the voice recognition server further includes decrypting the encrypted request message and the encrypted request message is a message encrypted with a second public key of the user by the voice recognition server and the first device decrypts the encrypted request message by using a private key of the user.

Furthermore, the connection forming method according to the embodiment of the present invention further includes outputting information indicating a connection result with the first gateway by using an output unit.

In order to solve the technical problem, a voice recognition system using Bluetooth low energy technology according to an embodiment of the present invention includes: a first device obtaining, from a user, a first voice signal associated with a first gateway, broadcasting the first voice signal and first user information for identifying the user, and forming a connection with the first gateway; a voice recognition server, as a server capable of processing a voice signal, receiving the first voice signal, analyzing the received first voice signal, and transmitting an encrypted connection request message to the first gateway based on an analysis result; and a first gateway receiving the encrypted connection request message from the voice recognition server and transmitting the received encrypted connection request message to the first device, in which the first voice signal is transmitted through an isochronous channel for transmitting and receiving an audio signal and the first user information is transmitted through a data channel for transmitting and receiving data.

Furthermore, the voice recognition system according to the embodiment of the present invention further includes performing a preliminary procedure for registering the voice recognition server in the first device, in which the first device stores server information including a first public key of the voice recognition server through the preliminary procedure, in which server information including a first public key of the voice recognition server is stored in the first device through the preliminary procedure.

Furthermore, in the voice recognition system according to the embodiment of the present invention, the second device obtains second user information including a second public key of the user, transmits the second user information to the voice recognition server, receives the server information from the voice recognition server, and transmits the received server information to the first device.

Furthermore, in the voice recognition system according to the embodiment of the present invention, the voice recognition server generates the encrypted connection request message by using the second public key of the user.

Furthermore, in the voice recognition system according to the embodiment of the present invention, the first device decrypts the received encrypted request message by using a private key of the user to authenticate the voice recognition server.

Furthermore, in the voice recognition system according to the embodiment of the present invention, the first device transmits, to the first gateway, a message indicating an authentication result of the voice recognition server.

Furthermore, in the voice recognition system according to the embodiment of the present invention, the first gateway transmits, to the voice recognition server, a message indicating the authentication result of the voice recognition server, which is transmitted from the first device.

In order to solve the technical problem, a first device forming a connection with a first gateway by using Bluetooth low energy technology according to an embodiment of the present invention includes: a communication unit wirelessly or wiredly communicating with the outside; and a processor functionally connected with the communication unit, in which the processor is configured to obtain a first voice signal of a user associated with the first gateway, broadcast first user information for identifying the user and the first voice signal, receive an encrypted request message for requesting the connection from the first gateway, authenticate a voice recognition server which is a server capable of processing a voice signal using the encrypted request message, and transmit a message indicating whether to accept the connection to the first gateway based on a result of the authentication, and the first user information is transmitted through a data channel for transmitting and receiving data and the first voice signal is transmitted through an isochronous channel for transmitting and receiving an audio signal.

Advantageous Effects

According to a method for transmitting and receiving data using Bluetooth technology according to an embodiment of the present invention, there is an effect that a voice recognition service can be provided through transmission and reception of voice data and audio data.

Furthermore, according to the present invention, there is an effect that multiple target devices forming a network can be remotely controlled through a voice signal.

Furthermore, according to the present invention, there is an effect that a specific gateway associated with a voice recognition service which a user intends to use among neighboring gateways can be selected only by a voice command.

Furthermore, according to the present invention, there is an effect that a preliminary procedure in which a user device and the voice recognition server exchange information is performed, and as a result, a security connection with the gateway can be formed by using a prestored key through the preliminary procedure.

Advantages which can be obtained in the present invention are not limited to the aforementioned advantages and other unmentioned advantages will be clearly understood by those skilled in the art from the following description.

DESCRIPTION OF DRAWINGS

FIG. 1 is a schematic view illustrating an example of a wireless communication system using a Bluetooth low energy technology to which the present invention is applicable.

FIG. 2 illustrates an example of an internal block diagram of a device capable of implementing methods proposed by this specification.

FIG. 3 illustrates an example of a Bluetooth communication architecture to which methods proposed by this specification may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present invention may be applied.

FIG. 6 illustrates characteristics of an audio signal.

FIG. 7 illustrates an example of a home ecosystem for applications where an isochronous channel may be used.

FIG. 8 illustrates an example of a Generic Audio Middleware (GAM) protocol stack to which the present invention may be applied.

FIG. 9 illustrates an example of a Generic Audio Middleware (GAM) architecture to which the present invention may be applied.

FIGS. 10 and 11 illustrate examples of Isochronous Connection-Oriented (ICO) and Connectionless Isochronous (ICL) channels and streams to which the present invention may be applied.

FIG. 12 illustrates message transmission between entities used for voice recognition technology according to an embodiment of the present invention.

FIG. 13 illustrates a method for controlling a target device using voice recognition according to an embodiment of the present invention.

FIG. 14 illustrates a method for selecting a specific gateway among a plurality of gateways according to an embodiment of the present invention.

FIG. 15 illustrates a process in which a voice input into a user device is transferred through a plurality of gateways according to an embodiment of the present invention.

FIG. 16 is a flowchart of a procedure in which a voice recognition service is performed according to an embodiment of the present invention.

FIG. 17 is a flowchart of a process in which a discovery procedure of FIG. 16 is performed according to an embodiment of the present invention.

FIG. 18 is a flowchart of a process in which selection and connection procedures of FIG. 16 are performed according to an embodiment of the present invention.

FIG. 19 is a flowchart of a process in which voice recognition start and ICO channel forming procedures of FIG. 16 are performed according to an embodiment of the present invention.

FIG. 20 is a flowchart of a process in which a voice recognition request/processing/response procedure of FIG. 16 is performed according to an embodiment of the present invention.

FIG. 21 is a flowchart of a process in which a disconnection procedure of FIG. 16 is performed according to an embodiment of the present invention.

FIG. 22 is a flowchart illustrating a device authentication process between two devices according to an embodiment of the present invention.

FIG. 23 is a flowchart of an authentication process in voice recognition according to an embodiment of the present invention.

FIG. 24 is a flowchart of an authentication process in voice recognition according to another embodiment of the present invention.

FIG. 25 illustrates a flowchart of a process in which a public key is exchanged and a process of generating and analyzing a cipher text using the public key and a private key according to an embodiment of the present invention.

FIG. 26 is a flowchart of a preliminary procedure in which a user device and a voice recognition server exchange a public key for security of a voice recognition service according to an embodiment of the present invention.

FIG. 27 is a flowchart showing a process of selecting a gateway using a voice signal and forming a connection with the selected gateway according to an embodiment of the present invention.

FIG. 28 illustrates a usage scenario for using a voice recognition service according to an embodiment of the present invention.

FIG. 29 is a flowchart showing a process in which a user device forms a connection with a gateway according to an embodiment of the present invention.

MODE FOR INVENTION

In order to help understanding of the present invention, the accompanying drawings which are included as a part of the Detailed Description provide embodiments of the present invention and describe the technical features of the present invention together with the Detailed Description. Like reference numerals principally designate like elements throughout the specification. Further, in describing the present invention, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Hereinafter, a method and an apparatus related with the present invention will be described in more detail with reference to drawings. In addition, a general term used in the present invention should be interpreted as defined in a dictionary or contextually, and should not be interpreted as an excessively reduced meaning. Further, a singular form used in the present specification may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by this specification.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertising message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by this specification may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined:

Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests.

Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement.

After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by this specification.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present invention may be applied.

A server transmits to a client an advertising message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smart phone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertising message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Overview of Isochronous Channel

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

In addition, since the operation of the link layer for transmitting an audio signal is not defined, the BLE has difficulty in transmitting an audio signal. Even if the audio signal is transmitted, a procedure for a user device (e.g., a headset, a phone, etc.) transmit the audio signal to a target device by discovering a device capable of receiving and processing the audio signal needs to be defined.

Thus, the present invention provides a procedure in which the user device may determine devices capable of recognizing and processing the audio signal of the user and transferring the processed audio signal to the target device in order to control the devices with the voice of the user.

Hereinafter, methods for transmitting and receiving periodically generated data (e.g., audio data, voice data, etc.) using the BLE technology will be described in detail.

That is, in the BLE technology, provided is a method for newly defining a channel for transmitting and receiving the periodically generated data and transmitting periodically generated data within a range that does not impair energy performance of the BLE by additionally defining a mechanism related to the newly defined channel.

Terms including audio stream data, audio data, audio streaming, audio stream, and the like may be interpreted as the same meaning.

Hereinafter, for convenience of understanding, it will be assumed that the terms are unified and used as the audio data.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 7 illustrates an example of a home ecosystem for applications where an isochronous channel may be used.

That is, FIG. 7 illustrates an example of a space in which multiple audio conductors and members to which the methods proposed by this specification may be applied may move within or outside each other's area.

As illustrated in FIG. 7, the presence of various conductors and members may imply that the isochronous channel is needed as a method for informing the presence of a member so that the member may obtain information required for configuring the isochronous channel.

The isochronous channel may also be used for transmitting and receiving non audio data.

The member may use isochronous channels to determine whether there are notification messages that may include acquisition information from conductors within a BLE communication range.

Further, the member may use the isochronous channels to receive a request for control information or service data from one or one or more devices acting as a remote controller.

FIG. 8 illustrates an example of a Generic Audio Middleware (GAM) protocol stack to which the present invention may be applied.

An audio architecture including an Audio Middleware Layer may support unicast and broadcast audios using the BLE.

The audio middleware layer facilitates a transition between connections of audio application programs and may develop a more developed user case.

As illustrated in FIG. 8, by adding an audio middleware layer capable of accessing all audio profiles, the GAM may provide a smooth audio service to the user even in a dynamic and multi-profile environment. Since middleware may handle switching between audio mixing of various user cases and the user cases, each profile may concentrate on a specific function.

Since the GAM may support multiple profiles, the user may select an audio content range and an application program which may seamlessly move between voice operating devices.

The GAM defines announcements for the audio streaming and signal transmission for audio control and data transmission. An application layer defines application signaling and required transmission parameters.

FIG. 9 illustrates an example of a Generic Audio Middleware (GAM) architecture to which the present invention may be applied.

FIG. 9 illustrates how the GAM is located within an overall Bluetooth architecture. Application Profiles on the GAM interact with specific functional entities within the middleware.

The functional entities are grouped as follows.

Audio stream notification and search: Defines a procedure of informing an availability of the audio stream or an availability of a device capable of consuming the audio stream. Further, an Audio Stream Announcement and Discovery function entity may be used searching the device.

Stream management: A procedure of configuring and forming an endpoint within the device provide coordination of multiple sinks and sources, management of policies, and switching between the streams. A stream establishing procedure provides information required by an initiator to instruct a core to schedule the isochronous channel. The stream control includes a procedure of providing the audio data among the configured endpoint, a state system for each channel in the stream, and a state system search procedure.

Audio control: Procedure of activating a device function when the audio stream is established. Basic call control capable of allowing, denying, and requesting the stream may be included in the audio control.

Broadcast control: Sets a broadcast audio channel and activates volume control.

As another audio work group defines requirements, media control and VR control may be then added to a release. An additional general control function may be added in order to support another user case when necessary. The control elements may inherit characteristics of a control procedure defined previously. Each control element includes a state system that is replicated to each device adjusted by using a general procedure for posting the state to an acceptor.

In the GAM, 6 interfaces for interacting a higher layer and a lower layer are defined as shown in Table 2 below.

TABLE 2

| Interface | Description |
|---|---|
| 1 | Interface to application-specific profile for announcements and discovery. |
| 2 | Interface to Core to send and receive audio announcements. |
| 3 | Interface to application-specific profile for stream management. |
| 4 | Interface to Core for isochronous channel configuration, establishment and stream control. |
| 5 | Interface to application-specific profile for audio control. |
| 6 | Interface to Core for audio control. |

Further, an additional interface for audio control and stream management entities in the GAM may be defined as shown in Table 3 below.

TABLE 3

| Interface | Description |
|---|---|
| 7 | Interface to allow Audio Control actions to invoke the relevant Stream Management functions and associated actions. |

Stream announcement and discovery, stream management and audio control interfaces ①, ③, and ⑤ may interact with a higher layer application program related profile by using primitives shown in Table 4 below.

TABLE 4

| Interface | Primitives |
|---|---|
| 1 | Announce Metadata (Initiator) |
|   | Discover Metadata (Acceptor) |
|   | Read Acceptor Status |
|   | Publish Acceptor Status |
|   | Metadata Received Event |
| 3 | ACE discovery and configuration |
|   | Rendering Endpoint |
|   | Presentation Delay |
|   | Acquisition Delay |
| 5 | Outgoing Call |
|   | Incoming Call |
|   | Accept Call |
|   | Hold Call |
|   | Reject Call |
|   | Terminate Call |
|   | Mute/Unmute Microphone |
|   | Mute/Unmute Speaker |
|   | Volume Control |
|   | List of current Calls |
| 7 | Open Stream |
|   | Configure Stream (flush timeout, retransmission, etc.) |
|   | Start Stream |
|   | Suspend Stream |
|   | Close Stream |
|   | Release Stream |

The present invention provides a method for selecting and connecting the gateway through the voice signal by using the GAM.

FIGS. 10 and 11 illustrate examples of Isochronous Connection-Oriented (ICO) and Connectionless Isochronous (ICL) channels and streams to which the present invention may be applied.

The isochronous channel, which is a channel for transmitting and receiving the audio data in the Bluetooth LE, is divided into ICO and ICL.

The ICO as a channel based on the connection of the Bluetooth LE may be established after ACL connection is established between two devices connected by the Bluetooth LE.

The application profile may require an isochronous stream with one or more time related channels. A profile manager (or some middleware) manages requests for multiple profiles, assigns a stream ID for each profile, and assigns a channel ID for the channel in the corresponding profile. The stream ID and the channel ID are transmitted to slave 1 S1 and slave 2 S2 when the master M establishes the ICO channel as illustrated in FIG. 10.

In the case of the ICO, one stream may be divided into two channel IDs and sent to the S1 and S2. For example, when the S1 is a wireless earphone attached to a right ear of the user and the S2 is a wireless earphone attached to a left ear, the user may listen to the music transmitted by M in stereo as illustrated in FIG. 10.

The ICL as a channel that is not based on the Bluetooth LE connection may be used for broadcasting the isochronous data. The isochronous data of the ICL channel may be broadcasted using a frequency hopping technique.

Unlike the ICO, the ICL may simultaneously transmit a single audio stream to a plurality of slaves (S) in a single direction (in the direction from the master to the slave). That is, the ICL supports multicasting.

The ICO and the ICL may transmit the audio signals to a plurality of devices and a plurality of profiles using the stream ID and the channel ID.

Table 5 below shows an example of a device type defined in audio technology of the Bluetooth LE and an operation scheme depending on the device type.

the user device. However, when the gateway 12020 may not interpret and process the audio signal, the gateway 12020 transmits the audio signal to the voice recognition server 12030 and requests interpreting and processing of the audio signal. That is, the gateway 12020 transfers the audio signal between the user device 12010 and the voice recognition server 12030. The gateway 12020 may transmit to the target device 12040 a request for controlling the target device based on a response transmitted from the voice recognition server 12030 and receive a response thereto from the target device 12040. The gateway 12020 may inform the user device 12010 of the presence of the voice recognition

TABLE 5

| Device | Event | Initiation | Underlying Action | Typical | Max |
|---|---|---|---|---|---|
| Phone | Incoming Call | External | ICO established | 2 sec | 5 sec |
|  | Start Call | User initiated on phone | ICO established | 2 sec | 5 sec |
| TV | Turn On | User selects HA connection with controller. | ICO established | 5 sec | 10 sec |
|  | Turn On | ISO established wih speakers? | ICO established | 5 sec | 10 sec |
|  | Add user | Needs Controller | Distribute GLK | 5 sec | 10 sec |
| Tablet | Video play | Local on tablet | ICO changes to ICL | 2 sec | 5 sec |
|  | Add user | User initiated | ICO > changes to ICL | 2 sec | 5 sec |
| Laptop | VoIP Call | External (incoming call) | ISO established | 2 sec | 5 sec |
|  |  | User initiated | ISO established | 2 sec | 5 sec |
| Remote Control | User press | Local (select device or volume, etc.) | ACL command to HA | 1 sec | 3 sec |
|  | Find Broadcasters | Background task? | Scan Audio-As | ? | 10 sec |
| Speaker | User presses ON | Local (connects to default source) | ICO established | 5 sec | 10 sec |
|  | User changes audio source | Action at speaker (if supported) or source | ICO established | 5 sec | 10 sec |
| Doorbell | Rings | External | ISO established | 2 sec | 5 sec |
| HA/Headset | Start Call | User initiated (open voice recog. channel) | ISO established | 1 sec | 4 sec |
| Audio Gateway | Voice Command | External (User intitiating) | ISO established | 1 sec | 3 sec |

FIG. 12 illustrates message transmission between entities used for voice recognition technology according to an embodiment of the present invention.

As illustrated in FIG. 12, a network using Voice Recognition (VR) technology may be constituted by a user device 12010, a gateway 12020, a voice recognition server 12030, and a target device 12040.

The user device 12010 is a device used as a sink of LE audio by the user. The LE audio refers to an audio signal transmitted using Bluetooth LE (hereinafter, referred to as BLE). The user device 12010 may form an audio channel for transmitting the audio signal to the gateway 12020. The user device 12010 is a portable Bluetooth device that includes a BLE module. As an example, the user device 12010 may be a smart phone or may be a hands-free device, such as a headset or a speaker. Further, the user device 12010 may include a microphone for receiving a voice from the user and may include a speaker for audio output.

The user device 12010 receives the voice from the user and converts the voice into the audio signal. As an example the user device 12010 may obtain a voice signal of the user which requests the control of the target device 12040. The user device 12010 transmits the audio signal to the neighboring gateway 12020 through the ICL or ICO channel which is the audio channel. The user device 12010 may receive a result of voice recognition from the gateway 12020 through the ICL or ICO channel.

The user device 12010 may be registered in advance in the gateway 12020 and the voice recognition server through a separate user authentication service (UAS) for registering/authenticating the user.

The gateway 12020 is a device that provides an artificial intelligence (AI) function. When the gateway 12020 may interpret and process the audio signal, the gateway 12020 interprets and processes the audio signal transmitted from service by using a scheme such as transmission of the advertising packet, etc. The gateway 12020 that supports the voice recognition function may be referred to even as an audio gateway.

The voice recognition server 12030 is a device that may understand and process a meaning of the voice signal of the user transmitted from the user device 12010 and is mainly a server type. The voice recognition server 12030 interprets the audio signal transmitted from the gateway 12020 and processes the audio signal so that the gateway 12020 may interpret the audio signal. Thereafter, the voice recognition server 12030 transmits to the gateway 12020 the audio signal processed in response to the request.

The target device 12040 is a device that the user desires to control. The target device 12040 may be a home device such as a washing machine, a refrigerator, or an air conditioner. The target device 12040 may be a plurality of devices.

As another example, a process of controlling the target device 12040 may not be used depending on the type of voice recognition service or contents of a voice command. In that case, only the user device 12010, the gateway 12020, and the voice recognition server 12030 may be used to provide the voice recognition service, and further, the network may be configured without including the target device 12040.

An audio channel as a channel which may exchange the voice signal (or data) in the BLE may mean the ICO and the ICL in the present invention. The audio channel may be constituted by 3 primary channels and 37 secondary channels.

Since the case of the ICO is based on the BLE connection, chaining between the channels is not required, but since the ICL is not based on the BLE connection, the chaining between the channels is required. The chaining between the channels means a method in which information indicating a channel in which next data or additional data is transmitted is included in a data packet. That is, when a device in a disconnected state receives a packet including data through a primary channel, information indicating a secondary channel in which the next data or additional data is transmitted is included in the packet. Thus, the device may move to the secondary channel based on the channel information included in the packet and receive the next data or additional data.

FIG. 13 illustrates a method for controlling a target device using voice recognition according to an embodiment of the present invention.

Referring to FIG. 13, the user device may control at least one target device through a voice for controlling the target device obtained from the user. In addition, a plurality of users may independently use the voice recognition service using their own user devices.

There is a limitation in that the user directly instructs the gateway to control the target device through the voice. For example, when the user and the gateway are far from each other not to transfer the voice or there are a plurality of gateways supporting the AI function in the vicinity of the user, the user may not find a gateway for controlling a specific target device.

In this case, as illustrated in FIG. 13, the user may transfer a control command as the audio signal to the gateway through a BLE audio channel (hereinafter, referred to as the isochronous channel) by using the user device. The gateway may control the target devices by processing the audio signal transmitted through an IP network through the voice recognition server. Further, the LE audio signal is transmitted through the isochronous channel, and as a result, a multi-connection may be formed, in which one user device simultaneously controls a plurality of target devices through the gateway.

In this manner, the user may control the target device through the voice over a long distance using the user device. That is, voice recognition coverage may be extended.

FIG. 14 illustrates a method for selecting a specific gateway among a plurality of gateways according to an embodiment of the present invention.

Referring to FIG. 14, the plurality of gateways are connected to different speech recognition servers, respectively. The plurality of gateways operate independently of each other and are associated with different voice recognition services.

The user attempts connection with a specific gateway with the user device in order to use a specific voice recognition service. In this process, there may be some problems for the user to select the specific gateway and form the connection.

As an example, when the user device does not have a voice recognition function while being the hand-free device, it may be difficult for the user to select one in a neighboring gateway list. As another example, when the user device does not have an input device such as a GUI or a display while being the hands-free device, the user device may not receive a password for security from the user even after the specific gateway is selected.

In order to solve the above problems, this specification proposes a method for selecting the gateway by using only the voice and forming the connection with the selected gateway.

FIG. 15 illustrates a process in which a voice input into a user device is transferred through a plurality of gateways according to an embodiment of the present invention.

The user device converts the audio signal input from the user into an LE audio signal. The user device transmits the LE audio signal to the gateway supporting the voice recognition function in the vicinity thereof.

In this case, there may be one or a plurality of gateways in the vicinity of the user device. The user device may transmit the audio signal to the voice recognition server using one or more gateways of the plurality of gateways in the vicinity thereof. One or more neighboring gateways receiving the audio signal transmit the audio signal to the voice recognition server through the IP network. As described above, the audio signal may be transmitted to the voice recognition server through the plurality of gateways in the vicinity of the user device. The audio signal is transferred through the plurality of gateways, thereby reducing a risk of loss of the audio data.

FIG. 16 is a flowchart of a procedure in which a voice recognition service is performed according to an embodiment of the present invention.

Referring to FIG. 16, a process of performing the voice recognition includes (1) a discovery procedure, (2) a selection and making connection procedure, (3) an initiating VR and establishing ICO channel procedure, (4) a VR Request/Processing/Response procedure, and (5) a disconnection procedure. Each of the above-described procedures may be performed by at least one entity of one or more gateways or voice recognition servers.

The user device obtains a discovery request for discovering the neighboring gateway from the user (S16010). That is, the user starts discovering the neighboring gateway with the user device. As an example, when the user device is the smart phone, the user may discover the neighboring gateway by touching a search icon displayed for using the voice recognition service.

Thereafter, a discovery procedure is performed in which the user device discovers a gateway supporting the voice recognition function in the vicinity thereof (S16020).

After the discovery procedure is completed, the user device informs the user of list information of the gateway obtained through the discovery procedure (S16030). As an example, the user device may output the list of the discovered gateway by using the display unit and the user may confirm information on the discovered gateways through the list.

Thereafter, the user device obtains information on a specific gateway from the user (S16040). The specific gateway is one of the gateways included in the list and is selected by the user. As an example, the user may confirm names of the gateways or a service name from information displayed through the display unit and select one gateway through the user input interface of the user device.

Thereafter, the selection and making connection procedure is performed (S16050). The selection and making connection procedure is a procedure in which the connection is formed between the user device and the selected gateway.

The user device is connected to the selected gateway and then, obtains information for requesting initiation of the voice recognition from the user (S16060).

After the voice recognition initiating request is received, the initiating VR and establishing ICO channel procedure is performed (S16070). In this procedure, a voice recognition (VR) function of the gateway is activated and the ICO channel is formed between the user device and the selected gateway.

After the channel is formed, the user device receives the voice from the user (S16080). As an example, the user device may obtain the voice of the user through a microphone inside or outside the device.

After the voice signal is received, the VR Request/Processing/Response procedure is performed (S16090). Specifically, in this procedure, the voice signal of the user is transmitted to the voice recognition server and then, processed by the voice recognition server, and a processing result is transmitted to the user device.

The user device informs the user of the processing result of the voice command (S16100). As an example, the user device may output the processing result by the voice using a text to speech function.

Thereafter, the user device obtains information for requesting termination of the voice recognition from the user (S16110). As an example, the user may touch a voice recognition termination button displayed on the device or request connection termination by the voice.

After the voice recognition termination request is obtained, the disconnection procedure is performed (S16120). In the disconnection procedure, the connection formed between the user device and the specific gateway for the voice recognition is terminated.

Thereafter, the user device informs the user of the termination of the voice recognition service (S16130). As an example, the user device may display that the connection is terminated by a display or output the termination of the connection by audio through a speaker.

Details of each procedure will be described later.

FIG. 17 is a flowchart of a process in which a discovery procedure of FIG. 16 is performed according to an embodiment of the present invention.

FIG. 17 illustrates a specific process of the discovery procedure (S16020) of FIG. 16 described above. Referring to FIG. 17, the user device may discover the gateway supporting the voice recognition function in the vicinity thereof through the discovery procedure.

The user device obtains a request or command for discovering the gateway supporting the voice recognition (VR) function from the user (S17010). The user device receives the discovery request and then, performs a scanning operation of receiving the transmitted message (S17020). The user device may receive the advertising packet transmitted from the gateways by using the scanning operation.

In this case, neighboring gateways (gateways 1 and 2) periodically broadcast the advertising packet through the BLE (S17030). The advertising packet is transmitted through the advertising channel and includes a voice recognition (VR) field. The VR field includes information for indicating that the gateway supports the VR service. Further, the VR field may include information such as a service name or UUID of the voice recognition service supported by the gateway. As an example, the VR field of gateway 1 may include shopping assistant name information and the VR field of gateway 2 may include each subway assistant service name information. The name of the VR field may be changed.

The user device may receive the advertising packets of the neighboring gateways by using the scanning operation and obtain the list of the gateways supporting the VR function through the information included in the received advertising packets.

The user device informs the user of the list of the gateways supporting the VR function obtained by the discovery (S17040). As an example, the user device may output list information by the voice using the text to speech function.

FIG. 18 is a flowchart of a process in which the selection and connection procedure of FIG. 16 is performed according to an embodiment of the present invention.

FIG. 18 illustrates a specific process of the Selection & Making Connection procedure (S16050) of FIG. 16 described above. Referring to FIG. 18, the user device may establish a connection for voice recognition with the selected gateway.

The user device receives information for selecting the gateway from the user through a function supported by the device, such as GUI or VR (S18010). The user selects one specific gateway providing a voice recognition service desired by the user among the gateways included in the gateway list. As an example, FIG. 18 illustrates that the user selects gateway 1. For convenience of understanding, it is assumed in the following drawing that gateway 1 of gateways 1 and 2 is a gateway selected by the user.

The user device transmits a message for requesting connection to the selected gateway (S18020). The selected gateway receives the message for requesting the connection and then, transmits the response message to the request message to the user device (S18030). Thereafter, ACL connection is formed between the user device and the selected gateway (S18040).

FIG. 19 is a flowchart of a process in which the initiating VR and establishing ICO channel procedure of FIG. 16 is performed according to an embodiment of the present invention.

FIG. 19 illustrates a specific process of the Initiating VR & Establishing 100 Channel procedure (S16070) of FIG. 16 described above. Referring to FIG. 19, the user device may establish a channel for transmitting the voice signal.

The user requests a start of the voice recognition (VR) to the user device in order to use the voice recognition service (S19010). As an example, the user may request the start of the voice recognition by pressing a start button embedded in the user device or touching a voice recognition start button displayed on the screen.

Thereafter, the user device transmits a message for requesting the start of the voice recognition function of the gateway to the gateway (hereinafter, referred to as gateway 1) selected in the Selection & Making Connection procedure (S16050) of FIG. 16 described above. The start of the voice recognition function indicates activation of the voice recognition function.

Gateway 1 receives the message for requesting the start of the voice recognition from the user device and then, transmits for requesting the start of the voice recognition function of the server to the voice recognition server (S19030). That is, gateway 1 forwards to the voice recognition server the voice recognition start request received from the user device.

The voice recognition server receives the message for requesting the start of the voice recognition from gateway 1 and then, updates a VR state to a VR start state. The VR state indicates in what state the voice recognition server is. In the profile of the voice recognition, the VR state may indicate one of start, stop, or processing.

Thereafter, the voice recognition server transmits the response message to gateway 1 in response to the request message (S19040). In this case, the response message transmitted to gateway 1 may include VR state information of the voice recognition server.

Gateway 1 receives the response message from the voice recognition server and then, transmits to the user device the response message to the voice recognition start request (S19050). The response message may include the VR state information of the voice recognition server. That is, gateway 1 may forward the state information of the voice recognition server to the user device.

Thereafter, the ICO channel for transmitting the audio stream used for the voice recognition is built between the user device and gateway 1. The audio stream corresponds to the voice command of the user.

After the channel is formed, the user device may display through the display unit information indicating that the user device is in a voice inputtable state for using the voice recognition service (S19070). As a display scheme, various schemes may be used according to the device.

FIG. 20 is a flowchart of a process in which a voice recognition request/processing/response procedure of FIG. 16 is performed according to an embodiment of the present invention.

FIG. 20 illustrates a specific process of the VR Request/Processing/Response procedure (S16090) of FIG. 16 described above. Referring to FIG. 20, the user may issue a command by using the voice and know the processing result.

Since the ICO channel for transmitting the voice signal is formed between the user device and the gateway in the process of FIG. 19 described above, the user may issue the command by the voice.

The user device receives the voice signal from the user (S20010). The voice signal corresponds to a voice command or a voice request. The voice signal may include requests or commands of various contents depending on the type of voice recognition service. As an example, the voice signal may include a current weather information request, a shopping assistant service connection request, a target device control command, a distance information request to a destination, or a destination location discovery request.

Thereafter, the user device transmits the voice signal input from the user to gateway 1 through the ICO channel (S20020). Gateway 1 is a gateway selected by the user in the Selection & Making Connection procedure (S16050) described above.

Gateway 1 transfers the received voice signal to the voice recognition server (20030). That is, the voice signal is forwarded. Gateway 1 may transmit the voice signal to the voice recognition server using all possible methods. For example, gateway 1 may transmit the voice signal by using the IP network or BLE.

The voice recognition server processes the received voice signal (S20040). The voice recognition server analyzes/interprets the voice signal and processes the voice signal so that the gateway may interpret the voice signal. The voice recognition server updates the VR state to a processing state. The processing state indicates a state in which the voice recognition server is analyzing the voice request or the voice command.

The voice recognition server transmits to gateway 1 a notification message indicating that the voice signal is being processed (S20050). The notification message includes the VR state information (processing state).

Thereafter, gateway 1 transmits to the user device the notification message indicating that the voice signal is being processed (S20060). Gateway 1 transfers to the user device the state information indicating that the voice signal is being processed by using the notification message.

Thereafter, the user device displays the information indicating that the voice signal is being processed by using the display unit (S20070). As an example, the user device may notify the user of the information that the voice command is being processed by using a text to speech (TTS) function.

The user device may perform an additional procedure to prevent another voice from being input from the user while the input voice is being processed. As an example, the user device may display a notification for requesting stopping of the input of the voice on the display until receiving a voice processing result. As another example, the user device may control the user input interface so as to prevent the voice from being temporarily input.

The voice recognition server transmits to gateway 1 a voice message indicating the processing result of the voice signal (S20080). As an example, the voice recognition server may obtain distance information up to the destination requested by the user by analyzing and processing the voice of the user. The voice recognition server may transfer the obtained result information of the voice recognition by using the voice message.

Gateway 1 receives the voice message from the voice recognition server and then, transmits to the user device the received voice message (S20090). That is, gateway 1 forwards the received voice message to the user device.

The user device informs the user of the voice processing result by displaying the voice message transmitted from gateway 1 through the display unit (S20100). Specifically, the user device reproduces the voice message by using the speaker, etc., and the user obtains a result for the voice request or command through the reproduced voice message.

FIG. 21 is a flowchart of a process in which a disconnection procedure of FIG. 16 is performed according to an embodiment of the present invention.

FIG. 21 illustrates a specific process of the disconnection procedure (S16120) of FIG. 16 described above. Referring to FIG. 21, the user device may terminate the connection with the gateway formed for the voice recognition.

The user device obtains a termination request or command for the voice recognition from the user (S21010). The user device may receive a connection termination request from the user by using various schemes according to the function. As an example, the user may request the termination of the voice recognition by touching the voice recognition termination button displayed on the user device. As another example, the user may request the termination of the voice recognition by using the voice.

Then, the user device transmits a request message for requesting the termination of the voice recognition to the connected gateway (gateway 1) (S21020).

After receiving the request message from the user device, gateway 1 transmits a message for requesting the termination of the voice recognition to the voice recognition server. That is, gateway 1 forwards the termination request of the voice recognition to the voice recognition server.

After receiving a message for requesting the termination of the voice recognition from the gateway, the voice recognition server updates the VR state to the VR stop state. Thereafter, the voice recognition server transmits the response message to the gateway 1 in response to the voice recognition termination request (S21040). The response message may include the VR state information.

Gateway 1 receives the response message from the voice recognition server and then, transmits to the user device the received response message (S21050). The response message may include the VR state information and include information for confirming that the gateway receives a command to terminate the voice recognition.

Thereafter, the ACL/ICO connection between the user device and gateway 1 is terminated (S21060). Accordingly, the voice recognition service is terminated.

The user device displays the termination of the voice recognition through the display unit (S21070). As described above with reference to the description related to FIG. 19 or 20, as the output scheme, various schemes may be used depending on the function of the user device. The user may know that the voice recognition service is terminated through the information displayed through the display unit.

In some cases, immediately after gateway 1 receives the message for requesting the termination of the voice recognition from the user device, gateway 1 transmits the response message to the user device, and as a result, the ACL/ICO connection may be terminated. That is, a message transmission/reception process between the gateway and the voice recognition server may not be used.

FIG. 22 is a flowchart illustrating a device authentication process between two devices according to an embodiment of the present invention.

Referring to FIG. 22, device A performs an authentication for exchanging encrypted data with device B. FIG. 22 illustrates a basic authentication process between two devices.

Device A and device B need to exchange public keys thereof in order to exchange the encrypted data. Before device A exchanges keys with device B, device A performs an authentication procedure to confirm that a device with which the public key is exchanged is device B. The reason is that another device (device C) may intercept the public key of device B by impersonating device B. If the device C intercepts the public key of device A, device C obtains data transmitted from device A. This creates a serious security problem. That is, the authentication process is a process of checking whether a target device with which the device is to exchange the key is a specific device that wants to transmit/receive the data.

Device A transmits a message indicating a specific operation to device B (S22010). Device B performs the specific operation based on the message received from device A (S22020). As an example, device B may display a number on a UI, receive a fingerprint, or flash an LED. As a result, device A may confirm that the target device that receives the message is device B.

Thereafter, device A and device B exchange a confirmation message for confirming the authentication (S22030).

Thereafter, device A and device B exchange the public keys and exchange the encrypted data generated using the exchanged public keys (S22040). Details regarding the exchange of the public keys and generation of the encrypted data will be described later.

FIG. 23 is a flowchart of an authentication process in voice recognition according to an embodiment of the present invention.

The process disclosed in FIG. 23 illustrates an authentication process when the user device and the voice recognition server do not share the public key in advance.

Since the user device and the voice recognition server do not share the public key in advance, the gateway periodically transmits gateway security credential information of the gateway. The credential information refers to cryptographic personal information used in a specific application of an information system. The credential information corresponds to a public key/private key pair, a public key certificate, or a password.

In FIG. 23, the gateway periodically broadcasts the advertising packet including the public key thereof (S23010).

Then, the user device obtains the public key of the gateway by receiving the broadcasted message and transmits a request message including the user information to the gateway (S23020). The user information may include identification information (user ID) for identifying the user.

The gateway and the voice recognition server perform key matching based on the received user information (S23030). Thereafter, the gateway and the voice recognition server select an encryption key of the user (S23040). Thereafter, the gateway transmits THE response message to the request message of the user device to the user device (S23050). The response message includes encryption information for the user.

However, in steps S23010 and S23020 described above, the user device obtains the public key from the broadcasted message, so that the user device may not confirm whether the obtained public key is the public key of the specific gateway.

FIG. 24 is a flowchart of an authentication process in voice recognition according to another embodiment of the present invention.

The process disclosed in FIG. 24 illustrates an authentication process when the user device and the voice recognition server share the public key in advance.

Since the user device already has the public key of the voice recognition server, the user device and the voice recognition server perform authentication and encryption using the shared public key.

The user device performs the key matching based on the selected gateway or voice recognition server (S24010). Thereafter, the user device selects an encryption key based on the voice recognition server or service (S24020). Thereafter, the user device transmits the request message including the user information to the gateway.

After the gateway receives the request message from the user device, the gateway and the voice recognition server perform the key matching based on the user information (S24040). Thereafter, the gateway and the voice recognition server select the encryption key of the user (S24050).

After the encryption key of the user is selected, the gateway transmits the response message to the request message of the user device to the user device (S24060). The response message includes the encryption information for the user.

Through the aforementioned process, the user device and the voice recognition server may perform the authentication and the encryption by using the public key shared in advance.

FIG. 25 illustrates a flowchart of a process in which a public key is exchanged and a process of generating and analyzing a cipher text using the public key and a private key according to an embodiment of the present invention.

In FIG. 25, process (a) shows a process in which the public key is exchanged between the devices in order to encrypt and transmit data. Process (b) shows a process in which device A generates a cipher text by using the exchanged public key in process (a) and device B interprets the transmitted cipher text.

First, process (a) is described. Device A and device B may share the key through process (a) by using a network (Internet or Bluetooth). Each device may transmit data by using the shared key.

A key exchange procedure is started between device A and device B (S25010). As an example, the key exchange procedure may be started by transferring a message for requesting a key exchange to the counterpart device by device A or device B.

After the key exchange procedure is started, devices A and B generate a pair of the public key and the private key of each device by using a specific algorithm. The public key has X coordinates and Y coordinates. As an example, the specific algorithm may correspond to Elliptic Curves Cryptography. The Elliptic Curves Cryptography is an encryption algorithm supported by a Bluetooth Controller module.

Specifically, device B generates the public key and the private key (S25020). Thereafter, device B transmits the message including the public key thereof to device A (S25030). Device A obtains the public key of device B from the message received from device B and generates the public key and private key thereof (S25040). Thereafter, device A transmits the message including the public key thereof to device B (S25050). As a result, each device obtains the public key of the counterpart device.

Thereafter, device A and device B generate a secret key (S25060). Devices A and B have the same secret key. After the secret key generation process, device A generates the encryption key (S25070) and device B also generates the encryption key (S25080). Thereafter, devices A and B exchange encrypted data (S25090).

First, process (b) is described. The device encrypts and transmits data by using the public key of a target device to which the device intends to send the data. As an example, device A generates encrypted data (or cipher text) by using the public key of device B, which is obtained through process (a) described above in order to transmit the data to device B. Device A generates the encrypted data by encrypting original data (or plain text) with the public key of device B. The plain text represents a character string to be encrypted or an original character string obtained by decrypting the cipher text. The cipher text is encrypted document (or data) so as to use only a specific device or a specific person by encrypting information in the plain text. Thereafter, the encrypted data is transmitted to target device B. The encrypted data may be broadcasted and transmitted.

Device B receives the encrypted data and decodes the encrypted data by using the private key thereof to obtain the original data. The data encrypted with the public key of device B may be decrypted only with the private key of device B. That is, the cipher text generated by using the public key of device B may be interpreted only by device B. Therefore, the security of the data may be maintained through process (b) described above.

FIG. 26 is a flowchart of a preliminary procedure in which a user device and a voice recognition server exchange a public key for security of a voice recognition service according to an embodiment of the present invention.

The procedure illustrated in FIG. 26 is performed before a gateway selection and connection procedure of FIG. 27, which will be described later. Referring to FIG. 26, user device 1, user device 2, and the voice recognition server are used in a pre-procedure. That is, two user devices are used. A procedure in which the user device and the voice recognition server exchange the public keys thereof is required for the security of the voice recognition service.

Both user device 1 (hereinafter, referred to as device 1) and user device 2 (hereinafter, referred to as device 2) are Bluetooth devices which perform communication by using the BLE technology. Both device 1 and device 2 may be used or controlled by the user.

Device 1 may receive the voice signal from the user. Device 1 does not include a display or a user interface through which the user may input information. As an example, device 1 may be a hands-free device such as a headset. After the pre-procedure is performed, the user may use the voice recognition service via device 1.

Device 2 corresponds to a smart device such as a smart phone having the display or the user interface.

First, the user logs in by using an application associated with the voice recognition service using device 2. Here, the voice recognition service means a voice recognition service that provides a specific service desired by the user. As an example, the user may log in using an application provided by a bookstore in order to use a book location search service by the voice. The ID and the password are registered in advance in the voice recognition server before log-in. Therefore, the voice recognition server may check whether the input ID and password are correct.

The user logs in using device 2 and device 2 obtains the user information. The user information includes user identification information for identifying the user and the public key of the user. The user identification information includes the ID of the user.

Thereafter, device 2 transmits to the voice recognition server a message including the user information (S26010). The public key of the user is transferred to the voice recognition server. In this case, the public key of device 2 may be together transferred.

The voice recognition server stores the user information included in the received message in the server (S26020). That is, the public key (hereinafter, referred to as the user public key) of the user and the user ID transferred from device 2 are stored in the voice recognition server.

After storing the user information, the voice recognition server transmits a message including voice recognition server information to device 2 (S26040). In this case, the transmitted message may be the response message to the message received from device 2. The voice recognition server information includes a public key (hereinafter, referred to as a server public key) of the voice recognition server and server identification information. The server identification information includes the ID of the voice recognition server.

Device 2 receives the message from the voice recognition server and stores the server information included in the message (S26040). Thereafter, device 2 transmits to device 1 the message including the user information (S26050).

Device 1 receives the message from device 2 and then, stores the voice recognition server information included in the message (S26060). Device 1 obtains a server public key from the received message. The information of the voice recognition server is stored in device 1, and as a result, the voice recognition server is registered in device 1.

Through the aforementioned process, a Bluetooth without the display or user interface such as the hands-free device may also obtain the voice recognition server information. Thereafter, user device 1 may securely transmit and receive data to and from the voice recognition server by using the server public key.

FIG. 27 is a flowchart showing a process of selecting a gateway using a voice signal and forming a connection with the selected gateway according to an embodiment of the present invention.

In FIGS. 17 to 18 described above, the user device first obtains neighboring gateway information by scanning the advertising packet advertised from neighboring gateways. The user may start the voice recognition after forming one-to-one ACL connection of the user device and the selected gateway.

However, when the method disclosed in FIG. 27 is used, the user may select a specific gateway by using the voice in a state in which the ACL connection is not formed and the user device may form the ACL connection with the selected gateway. The user device in FIG. 27 corresponds to user device 1 of FIG. 26 described above.

First, the user device obtains the voice signal associated with the specific gateway from the user (S27010). That is, the user inputs a voice command for requesting the connection with the specific gateway in the user device. The user may request or instruct the connection with the specific gateway by the voice. As an example, the user may input a voice 'connect a shopping assistant' in the hands-free device. A service list such as the 'shopping assistant' may be obtained through the pre-procedure of FIG. 26 described above. The voice signal may include a voice associated with the voice recognition service which the user intends to use. The voice signal may include a word, a title, or a wakeword associated with the specific gateway.

The user device broadcasts the voice signal of the user and the user information (S27020). The user information includes the ID of the user. In this case, the voice signal of the user is transmitted through an ICL isochronous channel and the user information is transmitted through a data channel. The user information corresponds to metadata. The metadata as structured data regarding data is data that describes other data. The metadata is also referred to as attribute information.

One or more gateways around the user device obtain the broadcasted voice signal and user information. Thereafter, the one or more gateways forward the received voice signal and user information to the voice recognition server (S27030). FIG. 27 illustrates that each of gateway 1 and gateway 2 receives the voice signal and the user information and forwards the received voice signal and user information to the voice recognition server. As an example, in FIG. 27, gateway 1 corresponds to a gateway forwarding the voice signal and a gateway selected by the user. As another example, like gateway 2, the gateway selected by the user and the gateway forwarding the voice signal may be different from each other.

The voice recognition server receives the voice signal and then, processes the voice signal (S27040). The voice recognition server analyzes the voice signal and determines an optimal gateway according to an analysis result. As an example, when a location information request of a book is obtained as a voice analysis result, the voice recognition server may determine the gateway of the bookstore as the optimal gateway.

The voice recognition server transmits a request message for requesting connection to the user device to the gateway determined as the optimal gateway (S27050). In FIG. 27, the optimal gateway determined by the voice recognition server corresponds to gateway 1.

A connection request message transmitted to the optimal gateway by the voice recognition server is an encrypted message. The voice recognition server checks the ID of the user included in the obtained user information and encrypts the request message by using the public key of the user corresponding to the user ID registered in the voice recognition server.

Gateway 1 receives the connection request message from the voice recognition server and then, transmits to the user device the connection request message (S27060). That is, gateway 1 transfers to the user device the encrypted connection request message transmitted from the voice recognition server. The connection request message is a message for requesting the ACL connection.

After receiving the connection request message, the user device performs an authentication procedure of authenticating the voice recognition server (S27070). Since the message received by the user device is encrypted using the public key of the user, the user device may authenticate the voice recognition server by decrypting the encrypted message with the private key of the user. When the transmitted encrypted message is decrypted using the private key of the user, authentication of the voice recognition server is successful and when the transmitted encrypted message is not decrypted, the authentication of the voice recognition server is unsuccessful.

The user device transmits to gateway 1 a response message indicating whether the connection request of gateway 1 is accepted based on an authentication result (S27080). The response message may be a message for accepting or rejecting the connection request according to the authentication result of the voice recognition server.

Gateway 1 transmits to the voice recognition server the response message to the connection request transmitted from the user device (S27090).

Thereafter, the user device may display through the display unit a connection result with gateway 1 (S27100). As a display scheme, various schemes may be used. As an example, the user device may output the result by the voice by using the text to speech function. The user may know the connection result with the gateway selected by the user through an output result.

Through the aforementioned process, the user may select and connect the gateway by using the voice.

FIG. 28 illustrates a usage scenario for using a voice recognition service according to an embodiment of the present invention.

Referring to FIG. 28, the user may use the voice recognition service only with the hands-free device. In FIG. 28, the hands-free device corresponds to user device 1. User device 2 corresponds to a smart device.

Specifically, ① the user accesses the voice recognition server using the smart device and logs in through the application. The voice recognition server stores the public key of the user and the user ID. The smart device and the hands-free device store the public key and the ID of the voice recognition server. A specific process may be performed similar to the process of FIG. 26 described above to refer to the description related to FIG. 26.

② The user moves a place only with the hands-free device.

③ The user inputs a voice for requesting the connection with the specific gate in the hands-free device. The hands-free device broadcasts the voice signal. Gateway 2 which is the neighboring gateway transfers the voice signal to the voice recognition server. When the gateway represented by the voice of the user is gateway 2, gateway 2 and the hands-free device are connected to each other. After the connection is formed, the user uses the voice recognition service.

FIG. 29 is a flowchart in which a user device forms a connection with a gateway according to an embodiment of the present invention.

Hereinafter, the same or similar steps as those described above will not be described in detail. For details, refer to the description related to the aforementioned drawings.

Hereinafter, a first device represents the user device and a first gateway represents the gateway selected by the user.

The first device obtains a first voice signal related to the first gateway from the user (S29010). This step may be performed in the same or similar manner to step S27010 of FIG. 27 described above.

The first device broadcasts user identification information for identifying the user and the first voice signal (S29020). This step may be performed in the same or similar manner to step S27020 of FIG. 27 described above. The user identification information is transmitted through a data channel for transmitting and receiving data and the first voice signal is transmitted through an isochronous channel for transmitting and receiving an audio signal.

The first device receives an encrypted request message for requesting the connection from the first gateway (S29030). This step may be performed in the same or similar manner to step S27060 of FIG. 27 described above.

The first device authenticates the voice recognition server by using the transmitted encrypted request message (S29040). This step may be performed in the same or similar manner to step S27070 of FIG. 27 described above.

The first device transmits a message indicating whether to accept the connection to the first gateway based on the authentication result. This step may be performed in the same or similar manner to step S27080 of FIG. 27 described above.

Furthermore, although the drawings have been described for the sake of convenience of explanation, it is also possible to design a new embodiment to be implemented by merging the embodiments described in each drawing. It is also within the scope of the present invention to design a computer-readable recording medium in which a program for executing the previously described embodiments is recorded according to the needs of those skilled in the art.

Configurations and methods of the described embodiments may not be limitedly applied to the gateway selection and connection method according to this specification, but all or some of the respective embodiments may be selectively combined and configured so as to be variously modified.

Meanwhile, the gateway selection and connection method of this specification may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of this specification have been illustrated and described above, this specification is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

In addition, in this specification, both the invention of the object and the invention of the method are described and the description of both inventions may be supplemented as necessary.

INDUSTRIAL APPLICABILITY

Although the data transmission and reception method of the present invention has been described with reference to the example applied to the Bluetooth LE, the data transmissions and reception method of the present invention can be applied to various wireless communication systems in addition to the Bluetooth LE system.

The invention claimed is:

1. A method for forming, by a first device, a connection with a first gateway by using Bluetooth low energy technology, the method performed by the first device, comprising:
   obtaining, from a user, a first voice signal associated with the first gateway;
   broadcasting first user information for identifying the user and the first voice signal;
   receiving an encrypted request message for requesting the connection from the first gateway;
   authenticating a voice recognition server which is a server capable of processing a voice signal using the encrypted request message; and
   transmitting a message indicating whether to accept the connection to the first gateway based on a result of the authentication,
   wherein the first user information is transmitted through a data channel for transmitting and receiving data and the first voice signal is transmitted through an isochronous channel for transmitting and receiving an audio signal.

2. The method of claim 1, wherein the encrypted request message is generated by the voice recognition server based on the first voice signal.

3. The method of claim 1, further comprising:
   performing a preliminary procedure for registering the voice recognition server in the first device,
   wherein the first device stores server information including a first public key of the voice recognition server through the preliminary procedure.

4. The method of claim 3, wherein the performing of the preliminary procedure includes
   receiving, from a second device, a message including the server information stored in the second device, and
   storing the server information.

5. The method of claim 1, wherein the authenticating of the voice recognition server further includes decrypting the encrypted request message, and
   wherein the encrypted request message is a message encrypted with a second public key of the user by the voice recognition server and the first device decrypts the encrypted request message by using a private key of the user.

6. The method of claim 1, further comprising:
   outputting information indicating a connection result with the first gateway by using an output unit.

7. A voice recognition system using Bluetooth low energy technology, the voice recognition system comprising:
   a first device obtaining, from a user, a first voice signal associated with a first gateway, broadcasting the first voice signal and first user information for identifying the user, and forming a connection with the first gateway;
   a voice recognition server, as a server capable of processing a voice signal, receiving the first voice signal, analyzing the received first voice signal, and transmitting an encrypted connection request message to the first gateway based on an analysis result; and
   a first gateway receiving the encrypted connection request message from the voice recognition server and transmitting the received encrypted connection request message to the first device,
   wherein the first voice signal is transmitted through an isochronous channel for transmitting and receiving an audio signal and the first user information is transmitted through a data channel for transmitting and receiving data.

8. The voice recognition system of claim 7, further comprising:
a second device performing a preliminary procedure for registering the voice recognition server in the first device,
wherein server information including a first public key of the voice recognition server is stored in the first device through the preliminary procedure.

9. The voice recognition system of claim 8, wherein the second device obtains second user information including a second public key of the user, transmits the second user information to the voice recognition server, receives the server information from the voice recognition server, and transmits the received server information to the first device.

10. The voice recognition system of claim 7, wherein the voice recognition server generates the encrypted connection request message by using the second public key of the user.

11. The voice recognition system of claim 7, wherein the first device decrypts the received encrypted request message by using a private key of the user to authenticate the voice recognition server.

12. The voice recognition system of claim 11, wherein the first device transmits, to the first gateway, a message indicating an authentication result of the voice recognition server.

13. The voice recognition system of claim 12, wherein the first gateway transmits, to the voice recognition server, a message indicating the authentication result of the voice recognition server, which is transmitted from the first device.

14. A first device forming a connection with a first gateway by using Bluetooth low energy technology, the first device comprising:
a communication unit wirelessly or wiredly communicating with the outside; and
a processor functionally connected with the communication unit,
wherein the processor is configured to
obtain a first voice signal of a user associated with the first gateway,
broadcast first user information for identifying the user and the first voice signal,
receive an encrypted request message for requesting the connection from the first gateway,
authenticate a voice recognition server which is a server capable of processing a voice signal using the encrypted request message, and
transmit a message indicating whether to accept the connection to the first gateway based on a result of the authentication, and
wherein the first user information is transmitted through a data channel for transmitting and receiving data and the first voice signal is transmitted through an isochronous channel for transmitting and receiving an audio signal.

* * * * *